ated Patent [19]

United States Patent [19]
Hori et al.

[11] Patent Number: 4,861,175
[45] Date of Patent: Aug. 29, 1989

[54] SERIAL PRINTER CONTROL SYSTEM

[75] Inventors: Masaaki Hori; Mitsuharu Kamiya, both of Nagoya, Japan

[73] Assignee: Brother Kogyo Kabushiki Kaisha, Nagoya, Japan

[21] Appl. No.: 185,314

[22] Filed: Apr. 20, 1988

Related U.S. Application Data

[63] Continuation of Ser. No. 884,092, Jul. 10, 1986, abandoned.

[30] Foreign Application Priority Data

Jul. 13, 1985 [JP] Japan ................. 60-154855
Jul. 13, 1985 [JP] Japan ................. 60-154856
Sep. 6, 1985 [JP] Japan ................. 60-198163

[51] Int. Cl.$^4$ ............................ B41J 11/42; B41J 5/46
[52] U.S. Cl. ....................................... 400/76; 400/61; 400/63; 400/68; 400/279
[58] Field of Search ............................ 400/61–65, 400/68, 76, 279; 364/900

[56] References Cited

U.S. PATENT DOCUMENTS

| | | | |
|---|---|---|---|
| 3,754,631 | 8/1973 | Wang | 400/76 |
| 4,086,660 | 4/1978 | McBride | 400/76 X |
| 4,091,911 | 5/1978 | Chang | 400/70 |
| 4,220,417 | 9/1980 | Sprott | 400/63 X |
| 4,240,758 | 12/1980 | Acosta | 400/63 X |
| 4,326,815 | 4/1982 | Kapp | 400/629 X |
| 4,403,301 | 9/1983 | Fessel | 400/63 X |
| 4,417,322 | 11/1983 | Berry | 364/900 |
| 4,464,730 | 8/1984 | Lawrence | 400/63 X |
| 4,497,589 | 2/1985 | Figini | 400/61 X |
| 4,523,294 | 6/1985 | Winn | 400/3 X |
| 4,553,860 | 11/1985 | Imaizumi | 364/900 X |

Primary Examiner—Paul T. Sewell
Attorney, Agent, or Firm—Dennison, Meserole, Pollack & Scheiner

[57] ABSTRACT

A serial printer control system with printing head position control for outputting signals to feed paper and to move a printing head in a direction perpendicular to the paper feed direction for controlling coordinates of the printing head relative to the paper. The system includes cursor keys for outputting a signal to the head position control to move the printing head and to feed the paper set to the printer. There is print control for controlling the printing head while printing on the paper. A print format control data storage stores a position of the printing head and a feed quantity of the paper in sequential order, each time the printing head moves to a desired print position, by driving the position control according to the cursor key operation. The system receives print data composed of plural unit print data. This data is printed at each position stored in the print format control data storage and is sent from a host computer. Also, the system receives print format control data stored in the print format storage, and outputs sequentially the print format control data to the printing head position control upon printing of the unit print data. This in turn drives the printing head position control to sequentially move the printing head to the printing position stored in the print format control data storage, and outputs the unit print data for driving the print control to sequentially print the unit print data.

12 Claims, 25 Drawing Sheets

STRUCTURE OF PRINT FORMAT

| FILE NO. | DATA NO. | FORMAT DATA | |
|---|---|---|---|
| 1 | 0 | $X_{10}$ | ⎫ |
| 1 | 1 | $X_{11}, Y_{11}, S_{11}$ | ⎬ FORMAT FILE 1 |
| ⋮ | ⋮ | ⋮ | |
| 1 | $N_1$ | $X_{1N_1}, Y_{1N_1}, S_{1N_1}$ | ⎭ |
| M | 0 | $X_{M10}$ | ⎫ |
| M | 1 | $X_{M11}, Y_{M1}, S_{M1}$ | ⎬ FORMAT FILE 2 |
| ⋮ | ⋮ | ⋮ | |
| M | $N_M$ | $XMN_M, YMN_M, SMN_M$ | ⎭ |

CONTENT OF FORMAT DATA

PRINT IN FORMAT FILE "M"

| $\overline{SWS1}$ | HIGH | LOW | HIGH | LOW |
|---|---|---|---|---|
| $\overline{SWS2}$ | HIGH | HIGH | LOW | LOW |
| CURSOR | ↑ | ← | → | ↓ |

ESTIMATE

NO ①
DATE ③

② MESSRS.

CASE NO. ④
RECIPIENT ⑤
DELIVERY PLACE ⑥
DELIVERY DATE ⑦
CARGO CHARGE ⑧
DEALING CONDITION ⑨
VALIDITY TIME OF ESTIMATE ⑩
TOTAL AMOUNT ⑫

PERSON IN CHARGE ⑪

⑬ ITEM    QUANTITY    UNIT PRICE    AMOUNT
⑭

| DATA NO. | | | |
|---|---|---|---|
| 1 | ESTIMATE NO. | TKY-01 (CR) (LF) | |
| 2 | COMPANY NAME | *** KABUSHIKI KAISHA (CR) (LF) | |
| 3 | DATE | (DAY) (MONTH) (YEAR) (CR) (LF) | |
| 4 | CASE NO. | PRINTER (CR) (LF) | |
| 5 | RECIPIENT | YOUR SPECIFIED PLACE (CR)(LF) | |
| 6 | DELIVERY PLACE | SAME AS ABOVE | |
| 7 | DELIVERY DATE | (DAY) (MONTH) (YEAR) (CR) (LF) | |
| 8 | CARGO CHARGE | CHARGED TO US (CR) (LF) | |
| 9 | DEALING CONDITION | AS USUAL (CR) (LF) | |
| 10 | VALIDITY TIME OF ESTIMATE | (DAY) (MONTH) (YEAR) (CR) (LF) | |
| 11 | PERSON IN CHARGE | ******* (CR) (LF) | |
| 12 | TOTAL AMOUNT | 123,000,000 (CR) (LF) | |
| 13 | ITEM  QUANTITY  UNIT PRICE  AMOUNT (CR) (LF) | | |
| 14 | ABC-01  1000  128,000  128000000 (CR) (CF) | | |

ESTIMATE

NO [1] —M1
DATE [3] —M3

* *
* *
* *
* *
* *
* *

PERSON IN CHARGE [11]

M2
[2] MESSRS.

CASE NO [4]
RECIPIENT [5]
DELIVERY PLACE [6]
DELIVERY DATE [7]
CARGO CHARGE [8]
DEALING CONDITION [9]
VALIDITY TIME OF ESTIMATE [10]
TOTAL AMOUNT [12]

ITEM    QUANTITY    UNIT PRICE    AMOUNT

SERIAL PRINTER CONTROL SYSTEM

This is a continuation of co-pending application Ser. No. 884,092, filed July 10, 1986, now abandoned.

BACKGROUND OF THE INVENTION (1) Field of the Invention

The present invention relates to a serial printer control system especially suitable for preparing a desired layout document by using a serial printer.

(2) Description of the Prior Art

Conventionally, when the serial printer is controlled by a host computer to carry out printing, it is necessary to create a complicated program with commands for specifying an operating position of a printing head and commands for controlling a paper feed quantity, so as to set a desired print format which makes a desired layout print. Therefore, a user is required to develop a private program for the purpose of preparing a document with a desired layout, which is inconvenient. Even if a specialized document preparing device, that is, a so-called word processor, can merely set a format selectively in a fixed range only, because it is hard to freely set and correct a print format.

Furthermore, as in both the above cases, unless the user precisely calculates a relation between a print paper and a print position in designing the print format, he cannot achieve printing at a desired position on the paper. Especially, in the case that print data are printed at predetermined positions on a preprinted paper, it is required to set the paper in the printer many times and repeat by trial and error to make a print format so that the print data may be printed at the predetermined position.

Further, it is preferable to easily and freely set a print pitch so as to prepare a document with a desired layout. But, the above-mentioned problems are also generated in the prior art.

Furthermore, even if the print format providing a desired printing layout is set, errors are frequently found after actual printing. The prior art systems make no provision for easily confirming the set print format prior to printing, and errors are found upon actual printing. In association with this, a print program must be reset and the print format must be corrected. Moreover, in the case when errors are found in the print format, or the print format is corrected as newly required, the prior art requires complicated steps. In addition, correction of only one print format data causes a requirement to correct the entire print format.

In a step of feeding paper to the printer, when crumpling and wrinkling of the paper, which will be referred to as paper jam, happens, a desired document cannot be prepared.

In the conventional serial printer, paper is fed into a small gap between a platen and a printing head along an outer circumferential surface of the platen. For smooth feeding of the paper, a carriage is provided with a paper holder, which also is called a scale, of a transparent plate arcuately curved along the platen with a small gap defined between the same and the platen. The paper is fed from a back surface of the platen along a lower surface to a partly cylindrical paper guide arranged at a fixed distance from the platen. The paper fed is ejected from a front portion of the platen through the printing head to bail rollers. Owing to the paper holder mounted to the carriage, the paper is smoothly introduced into the space between the platen and the printing head, is curvedly fed along the outer circumferential surface of the platen, and is upwardly guided between the paper holder and the platen. The paper guided by the paper holder is finally pressed on the platen by the bail rollers.

Accordingly, the paper holder mounted on the carriage has an important function for smooth introduction of the paper, and if it were not for the paper holder, smooth introduction of the paper would be almost impossible. It is preferable that the width of the paper holder is not greater than the carriage, since there is an unprintable area at both ends of the platen by the provision of the paper holder. The paper holder is provided with a window or a recess at a central portion, since a tip of the printing head is projected through the window or the recess. When the paper holder is located at a position out of the width of the paper upon insertion of the paper, the paper cannot be smoothly turned along the platen to cause a paper jam. In the case where a side edge of the paper is located at the central portion of the paper holder, a corner of the paper is caught by the window or the recess of the paper holder and the tip of the printing head to cause a paper jam. Furthermore, when the paper holder is located at the end of the paper with respect to the width of the paper, smooth feeding of the paper cannot be effected because of an unbalance caused by tension applied to the paper which results in a paper jam.

To avoid such problems, the carriage is moved to the longitudinal central position of the platen upon introduction of the paper. However, the amount of movement of the carriage is preset to an inherent value of the printer irrespective of a size of the paper, and cannot be changed. As the size of the paper is widely varied in the range of a post card size to an A3 size, for example, there is a possibility that the paper holder will not align to the paper or will come to the edge of the paper in dependence upon a width of the paper and a paper set position in the lateral direction of the platen. Therefore, this also causes a jam of the paper.

SUMMARY OF THE INVENTION

Accordingly, it is a first object of the present invention to make a setting for a print format which is easy for effecting printing of print data at a predetermined paper position.

It is a second object of the present invention to provide a print format setting system for easily setting a print format for effecting printing of a predetermined print data only at a predetermined position of a layout printed paper.

It is a third object of the present invention to improve utility of the system by providing a subsystem for allowing the print format once set to be easily confirmed.

It is a fourth object of the present invention to improve utility of the system by providing a subsystem for allowing the print format once set to be easily confirmed and another subsystem for allowing the print format to be easily corrected as required.

It is a fifth object of the present invention to improve utility of the system by providing a subsystem for preventing generation of a paper jam upon introduction of the paper; that is, the subsystem including a first subsystem for variably setting a printing head moving position upon introduction of the paper and a second subsystem for moving the printing head to the set position and thereafter inserting the paper to thereby smooth the introduction of the paper, irrespective of paper size and paper set position.

BRIEF DESCRIPTION OF THE DRAWINGS

FIG. 21 is a plan view of a printed paper in a predetermined form print starting positions of unit data;

FIG. 22 is an illustration of exemplary print data for showing a method of setting the print data in the host computer;

FIG. 24 is an illustration showing a result of test print;

DETAILED DESCRIPTION OF THE PREFERRED EMBODIMENTS

Figure 27:
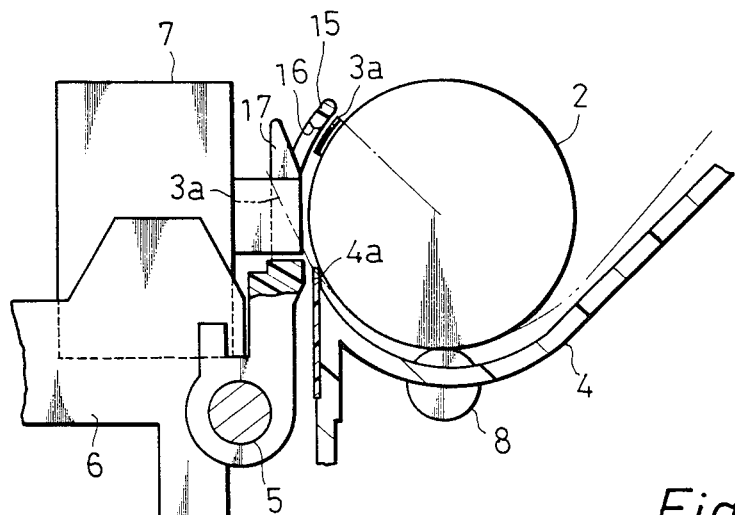
FIGS. 27 to 29 are views of an essential part of a serial printer employing the present invention.
Figure 28:
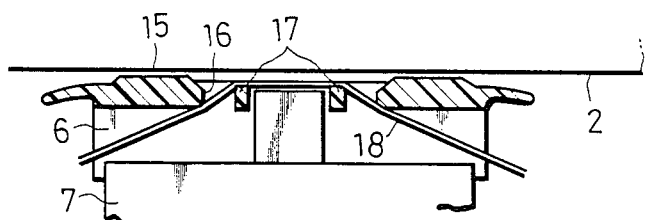
Figure 29:
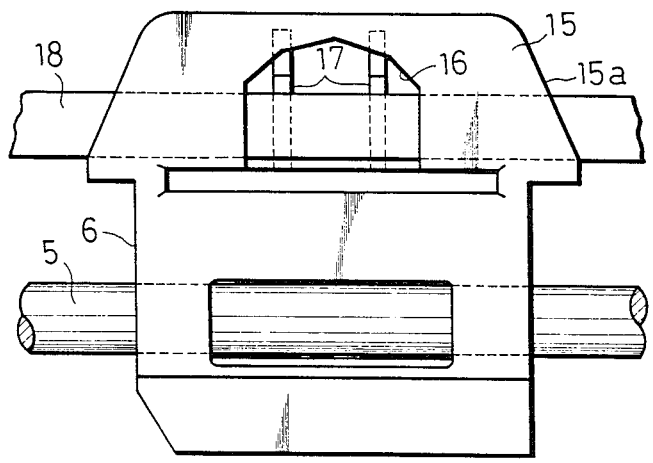

Referring to FIGS. 27 to 29, similar to a general serial printer, the printer shown to be employed by the present invention includes a cylindrical platen 2 supporting a paper on a part of its outer circumference and a printing head 7 facing to the platen 2. The platen 2 is driven by a LF motor (not shown) and rotated about its axis to feed the paper. The printing head 7 carries out printing of a dot matrix pattern on the paper, and is mounted to a carriage 6 reciprocated parallel to the axis of the platen 2, that is, in a direction perpendicular to a paper feed direction, in such a manner that a space between each dot of the dot matrix pattern is a minimum unit. The carriage 6 is provided with a paper holder 15 having a structure similar to that previously mentioned.

Figure 1:
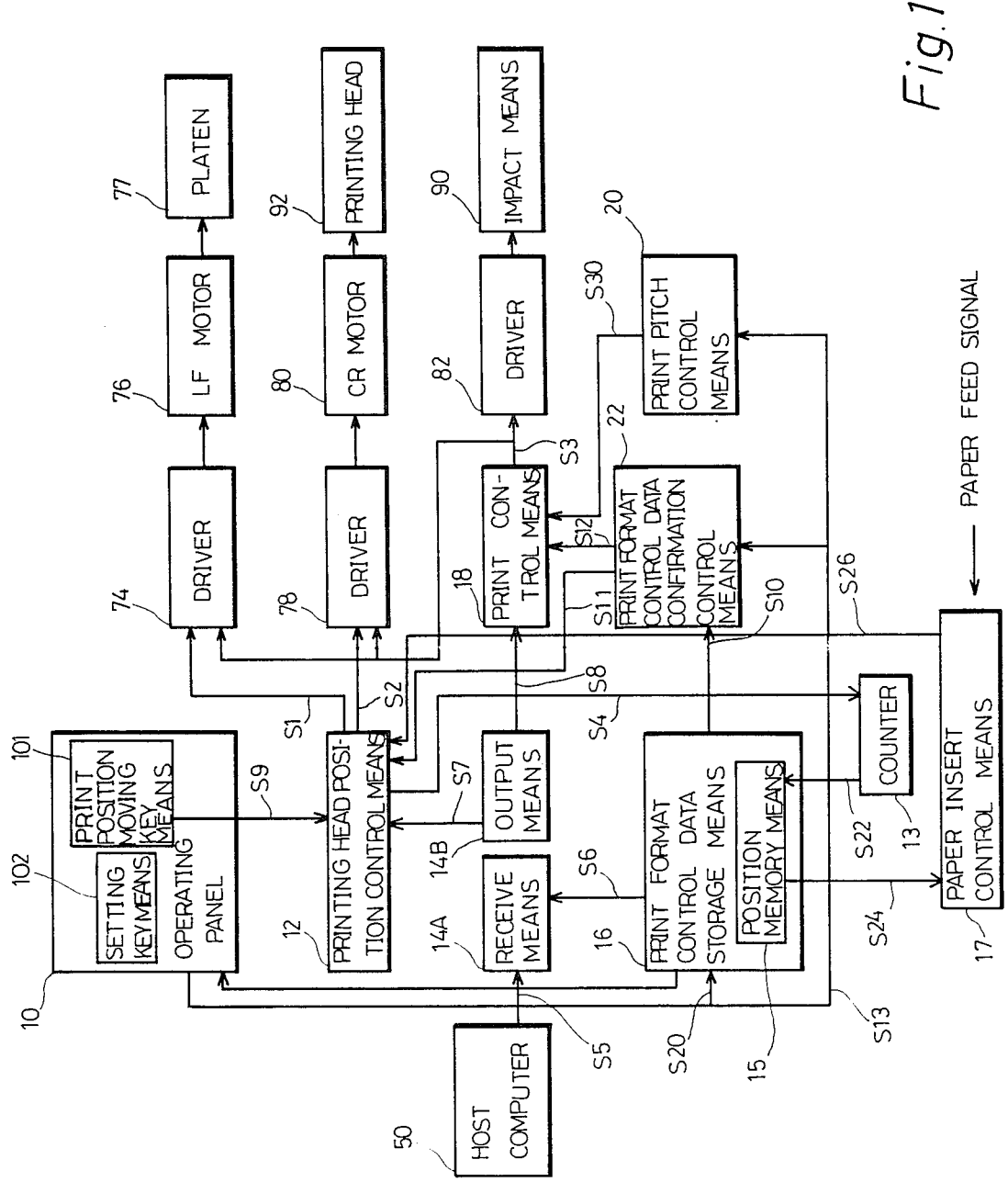
FIG. 1 is a block diagram of the system of the present invention.

Referring now to FIG. 1, a block diagram of the present invention comprises an operating panel 10 for receiving inputs of various manual operations. A printing head position control means 12 outputs a signal S1 for feeding paper in a printer (not shown) and a signal S2 for moving a printing head 92 in a direction perpendicular to a paper feed direction to control movement of the printing head 92 relative to the paper (not shown). Print control means 18 outputs a signal S3 for controlling printing of data by the printing head 92. Print format control data storage means 16 stores an abscissa of the printing head 92 and a paper feed amount equal to a total rotational amount of the platen 77 through a counter 13 by signals S4 and S22 when an operator operates a key 101 of the operating panel 10 to drive the printing head position control means 12 and move the printing head 92 and the platen 77 so as to locate the printing head 92 in opposed relation with print positions on paper being imprinted. Receive means 14A receives from a host computer 50 a print data S5 constituted of a set of unit print data to be printed at the print positions, and also receives a control data signal S6 from the control data storage means 16. Output means 14B outputs a signal S7 to the printing head position control means 12 at commencement of a printing operation so as to drive the means 12 and move printing head 92 and platen 77 to a set-print position, and also outputs a signal S8, containing the unit print data to the print control means 18 to drive the latter so as to serially print the unit print data. Driving of the printing head 92 and the platen 77 is accomplished by respective drivers 74 and 78 through respective motors 76 and 80. Data confirmation control means 22 receives a signal S10 from storage means 16, and outputs a signal S11 to printing head position control means 12 by operation of the appropriate key (not shown) on panel 10 so as to move printing head 92 and platen 77 to an intended position. Means 22 also outputs a signal S12 to the print control means 18 for printing a predetermined character at the intended position once same is reached. Counter means 13 counts an amount of movement of the printing head 92 and the platen 77 and retains current coordinates of the positions of the printing head 92 and the platen 77. A position memory means 15, forming part of storage unit 16, stores a value retained by the counter 13 upon operation of a setting key 102 of the operating panel 10. Paper insert control means 17 receives a data signal S24 stored in the position memory means 15 and outputs to the means 12 a signal S26 to move the printing head 92 to the position set by the position memory means 15, and control feed of the paper to carry out insertion of the paper. A driver 82 actuated by a signal S3 from print control means 18 is connected to impact means 90 of the printing head 92.

The operating panel 10 may be installed in the printer body or independently of the printer body. The printing head position control means 12 acts to receive a control signal S9 from the operating panel 10 and a control signal S7 from the input control means 14 to drivers 74 and 78 and thereby move the printing head and platen to a predetermined relative position.

The receive means 14A functions to receive print data from the host computer 50 upon actual printing to drive the head printing position control means 12 and thereby move the printing head 92 and the platen 77 to a predetermined position according to control data stored in the print format control data storage means 16, and also functions to drive the print control unit 18 to control printing of unit print data from the print position thereof.

The host computer 50 acts to output the print data constituted of various unit print data to the input control means 14, and each of the unit print data is specified by a terminate code, indicating the end of unit data, a data number, or the number of a character, and the like, and is thereby distinguished from other unit print data. Further, the print data to be outputted from the host computer 50 may include a commenting character data which ignores printing of the data upon printing as well as the unit print data to be printed. The receive means 14A acts to select unit print data to be printed at a specified position from a series of print data as received from the host computer 50. The print control means 18 functions to receive unit print data from the output means 14B to drive the drivers 74, 78 and 82 and thereby control printing of the data.

Data confirmation control means 22 acts to receive a control data signal S10 from the print format control data storage means 16 by the operation signal S13 from the operating panel 10 and output the control signal S11 to the printing head position control means 12 so as to drive the control means 12 to move the printing head 92 and the platen 77 to a set position and also output a control signal S12 to the print control means 18 to drive the control means 18 to thereby print a predetermined character. The predetermined character may be appropriate such as the number of print data. The data confirmation control means 22 functions to sequentially move the printing head 92 and the platen 77 to a print position as determined by the print format control data for the purpose of confirmation of the data after all of the data is determined and print a predetermined character, and also functions to call correction data only upon editing of the print format control data as set once, and actually move the printing head 92 and the platen 77 to the print position according to the data to thereby confirm the correction data only.

Furthermore, the system of the present invention includes print pitch control means 20 for setting a print pitch of the print data. The print pitch control means 20 outputs a signal S30 to the print control unit 18 so as to control the amount of space between characters to be printed upon actual printing, and also indicates information of a print pitch upon confirmation of the print format data.

In the discussion below, a mode for indicating the information of the print pitch may be such that an area corresponding to one character inclusive of a character size and a character space is shown by a box, or the character space is shown by a spacing between two vertical ruled lines.

Figure 2:
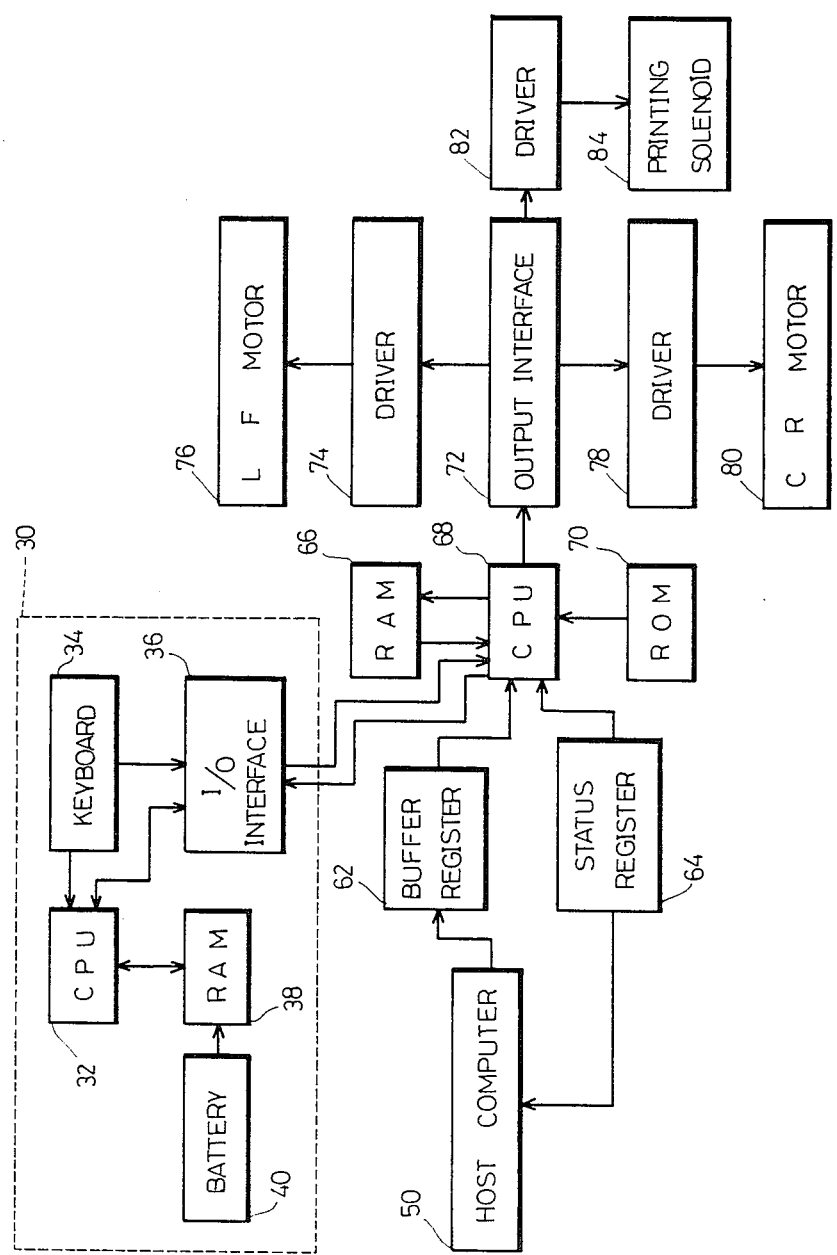
FIG. 2 is a block diagram of a preferred embodiment according to the present invention.

Referring next to FIG. 2, the system of a preferred embodiment comprises a control panel as part of a hand-operated device 30 independent of the printer body (not shown) and a main device (not shown) incorporated in the printer body which main device is primarily constituted of a computer system.

The operating device 30 comprises a keyboard 34 for receiving various operating inputs. A CPU 32 prepares and processes the print format control data, while a RAM 38 stores the print format control data and the like. A battery 40 retains a content stored even when no current is supplied from the printer body, and an I/O interface 36 carries out communication of data with a CPU 68 in the aforementioned main device.

The printer includes a buffer register 62 for receiving print data from the host computer 50, a status register 64 for informing the host computer 50 of the status, a CPU 68 for carrying out print processing, a ROM 70 for storing a print processing program and various parameters, a RAM 66 for storing the print format control data, and the print data, and the like. The CPU 68 is connected to an output interface 72 which is in turn connected to a driver 74 for driving a LF motor 76, which driver is in turn connected to the LF motor 76 for rotating the platen 77 and feeding paper. The output interface 72 is further connected to a driver 78 for driving a CR motor 80, which driver 78 is in turn connected to a CR motor 80 for reciprocatively moving the printing head 92 in a direction perpendicular to a paper feed direction. The output interface 72 is further connected to a driver 82 for driving a printing solenoid 84.

Figure 3:
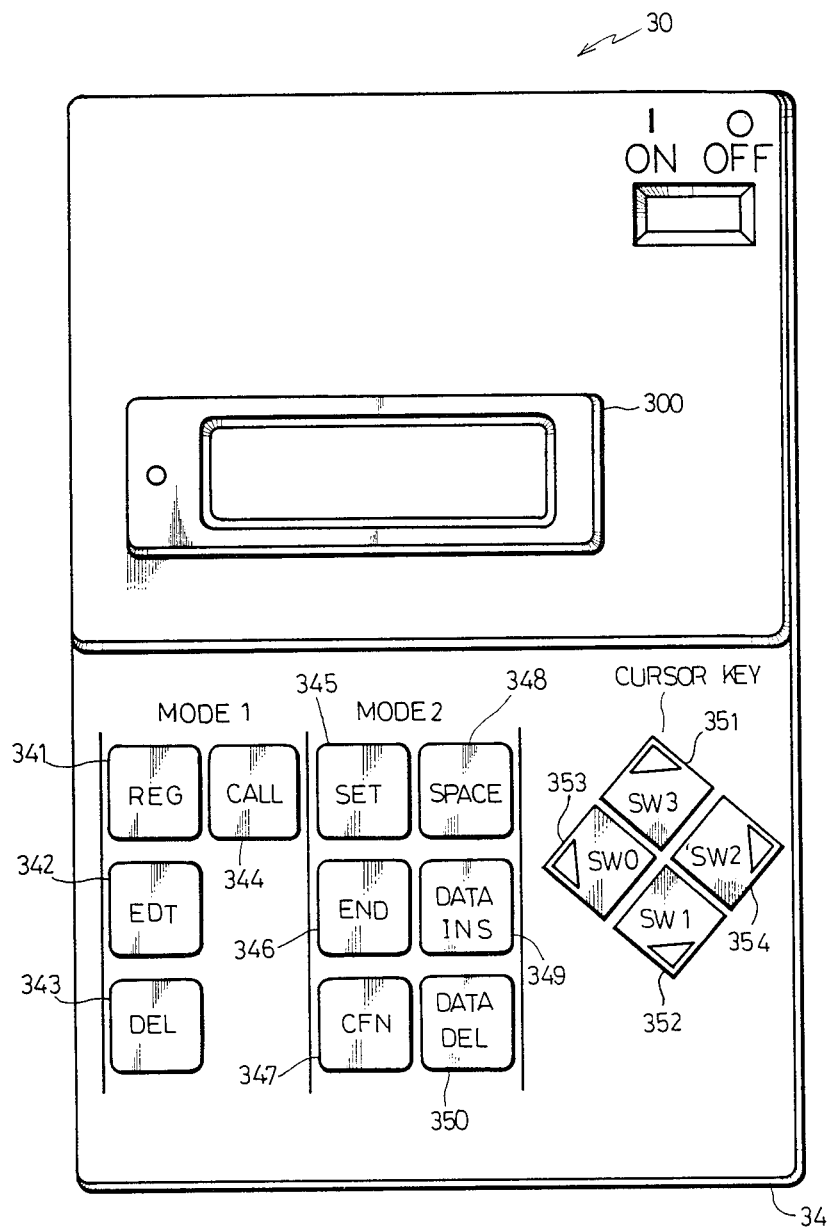
FIG. 3 is a plan view of an operating device used in the preferred embodiment.

Referring to FIG. 3 which shows the operating device 30 in plan, the keyboard 34 has a mode 1 key, mode 2 key and cursor key. The mode 1 key comprises a register key 341 for preparing and registering the print format control data, an edit key 342 for editing the print format control data registered, a delete key 343 for deleting the print format file control data registered, and a call key 344 for transferring the print format control data to the RAM 66 of the main device to control printing. The mode 2 key comprises a set key 345 for setting a registration number and a print position of the printing head 92, an end key 346 for ending a mode 2, a confirmation key 347 for printing and confirming a position of the print format control data registered and a print pitch, and so forth, prior to formal printing, a data insert key 349 for inserting the format data, and a data delete key 350 for deleting the unit format data.

The cursor key on the keyboard is constituted of four cursor keys 351, 352, 353 and 354. The cursor keys 353 and 354 are utilized for moving the printing head 92, while the cursor keys 351 and 352 are utilized for rotating the platen 77. The cursor keys 351 and 352 are also utilized for increasing and decreasing numerals to be indicated by a liquid crystal display panel 300, which will be hereinafter described, one by one according to a condition for utilization.

The liquid crystal display panel 300 indicates a file number which shows the number of the print format control data, a data number which shows the number of print position in one file, and any messages such as an error message. There are incorporated in the operating device 30 the CPU 32, I/O interface 36, RAM 38 and battery 40 as seen in FIG. 2.

Figures 4, 5:
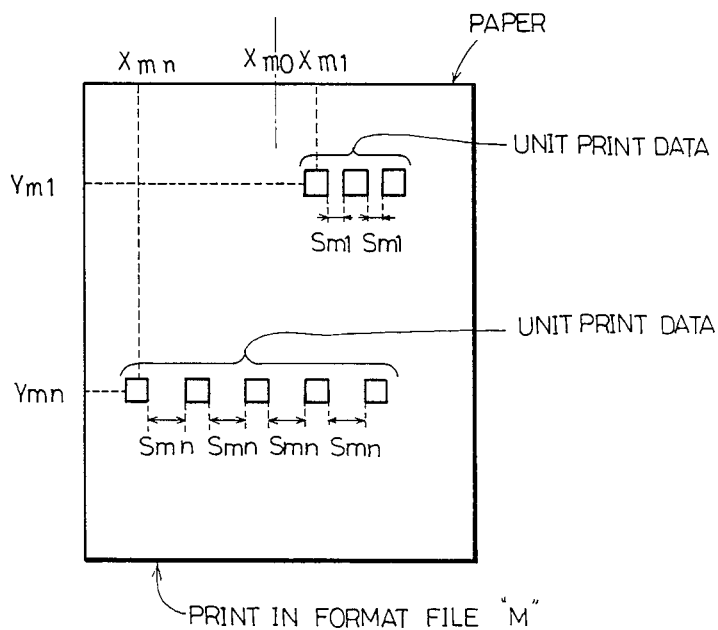
FIG. 4 is an illustration showing structure of format data in a print format.
FIG. 5 is an illustration showing content of the format data in FIG. 4.

Referring to FIG. 4 which shows a data structure of print format employed in the present system, one format data is constructed by $X_{mn}$, $Y_{mn}$ and $S_{mn}$, wherein the subscript m means that the format data belongs to a print format file m, and the subscript n means that the format data relates to a print position of the data number n in the format file m. As shown in FIG. 5, X corresponds to an abscissa of the paper at the print position, and Y corresponds to a paper feed quantity. The letter S represents data for defining a print pitch of characters. The format data relates to a print position of one unit print data. A set of the format data in one format is represented by a format file. A total set of the format file is represented by a print format. A plurality of format files may be stored in RAM 38, and one of the format files is selected and transferred to RAM 66.

When any unit print data are fed from the host computer 50 under the condition that a format file m is stored in RAM 66, the unit print data are printed according to the print position and the print pitch as determined by each format data in the order of the data numbers 1, 2, 3 ... per each unit print data. One example of the print data to be fed from the host computer 50 is shown in FIG. 22, wherein the unit print data is separated by a CR code for commanding print on the next line and a LF code for commanding rotation of the LF motor and paper feed by one line to form each unit print data.

Figure 6:
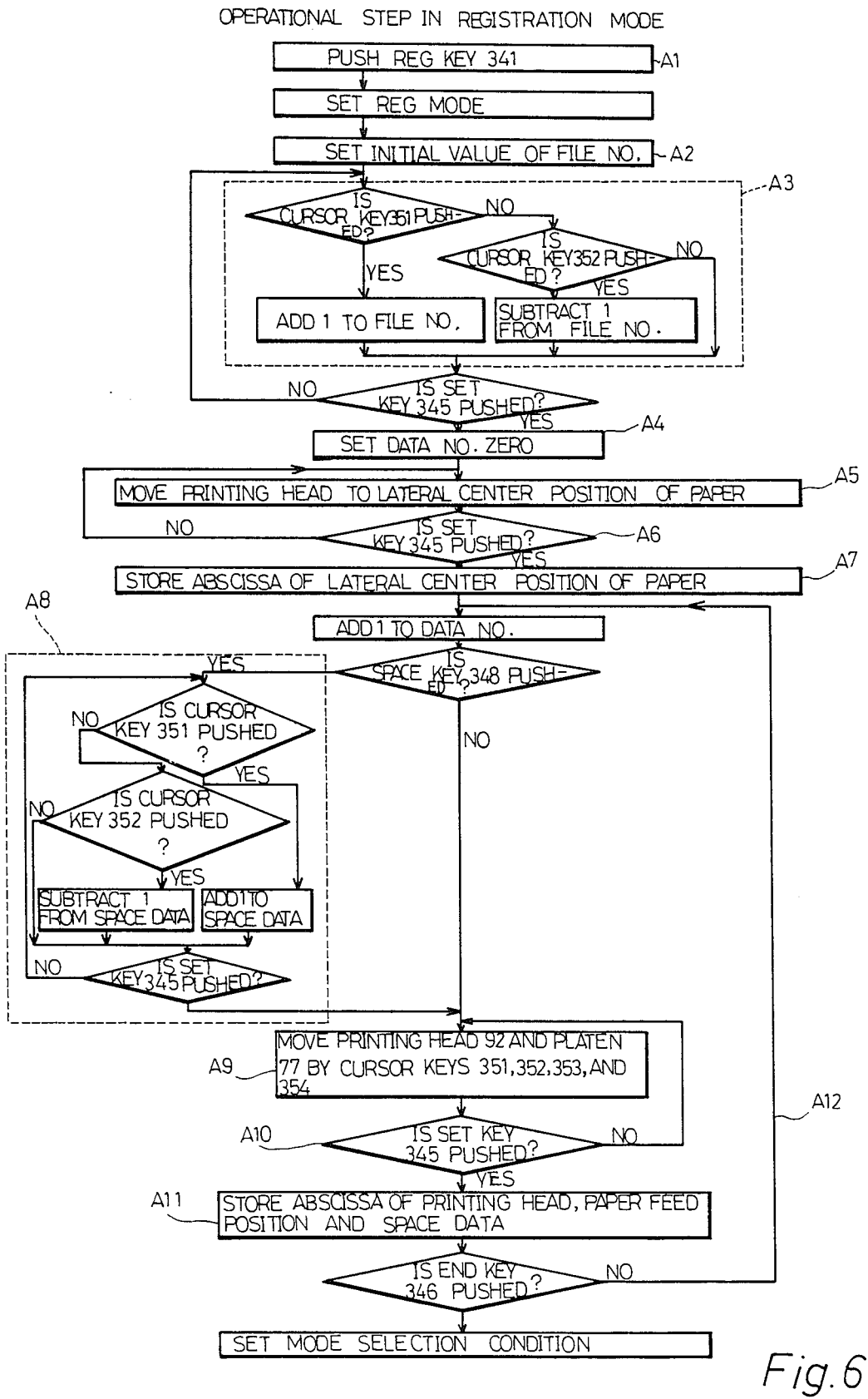
FIG. 6 is a flow chart showing an operational step of registration of the format data.

Referring next to FIG. 6 which shows a flow chart of the registration process of the format file, the register key 41 is depressed at step A1 to start a program for storing the format data in RAM 38. At first, an initial value of a file number is indicated on the display panel 300 at step A2, which file number is a lowest available number not registered. At this time, if any file number other than the current number is intended to be indicated, the cursor key 51 or 352 is operated. For example, in block A3, if the cursor key 351 is depressed, the file number is increased by 1, and if the cursor key 352 is depressed, the file number is decreased by 1. When the setting key 345 is depressed with a desired file number indicated, the desired file number is set. Then, at step A4, an initial value (zero in the present system) of data number is indicated on the display panel 300.

In the present system, the data number 0 is processed first. An abscissa corresponding to a lateral center position of a sheet of paper is allocated at the data number 0 as shown in FIG. 5. At steps A5, A6 and A7, the printing head 92 is moved to the lateral center position of the paper by the operation of the cursors 354 or 353, and the set key 345 is depressed to thereby allocate the abscissa of the lateral center position of the paper at the data number 0. The abscissa is utilized for moving the printing head 92 to the lateral center of the paper prior to paper induction to the front surface of the platen, so as to prevent generation of a jam of the paper upon feeding of the paper.

Next, 1 is added to the data number to permit setting and registering of the data number 1. Under the condition, when the space key 348 is depressed, a character space between characters to be printed is corrected in block A8. The character space may be set by x/180 inch, for example and x is set at 3 under the initial condition. A current value of x is indicated on the display panel 300 by the depression of the space key 348. Next, if the cursor key 352 is depressed, x is decreased by 1, while if the cursor key 351 is depressed, x is increased by 1. The cursor key 351 or 352 continues to be depressed until a desired space number x is obtained. The set key 345 is depressed upon obtaining of the desired space number x to input the space data. The space data once inputted is maintained until it is next edited.

Next, at steps A9, A10 and A11, an abscissa at the print position of the data is input. Namely, the cursor keys 353 and 354 are depressed to horizontally move the printing head 92 to an arbitrary position, and the cursor keys 351 and 352 are depressed to rotate the platen 77 to feed the paper to an arbitrary position. Under the condition where the printing head 92 is operated to be located in opposed relation with the print position of the paper, the set key 345 is depressed to store the abscissa of the printing head 92 and the paper feed quantity. Thus, registration of the format data at the data number 1 is completed. If the end key 346 is not depressed, the format data at the subsequent data number is permitted to be registered as shown by A12. The above-mentioned registration process is carried out for all of the print positions, and then the end key is depressed to thereby complete registration of one format file.

Figure 7:
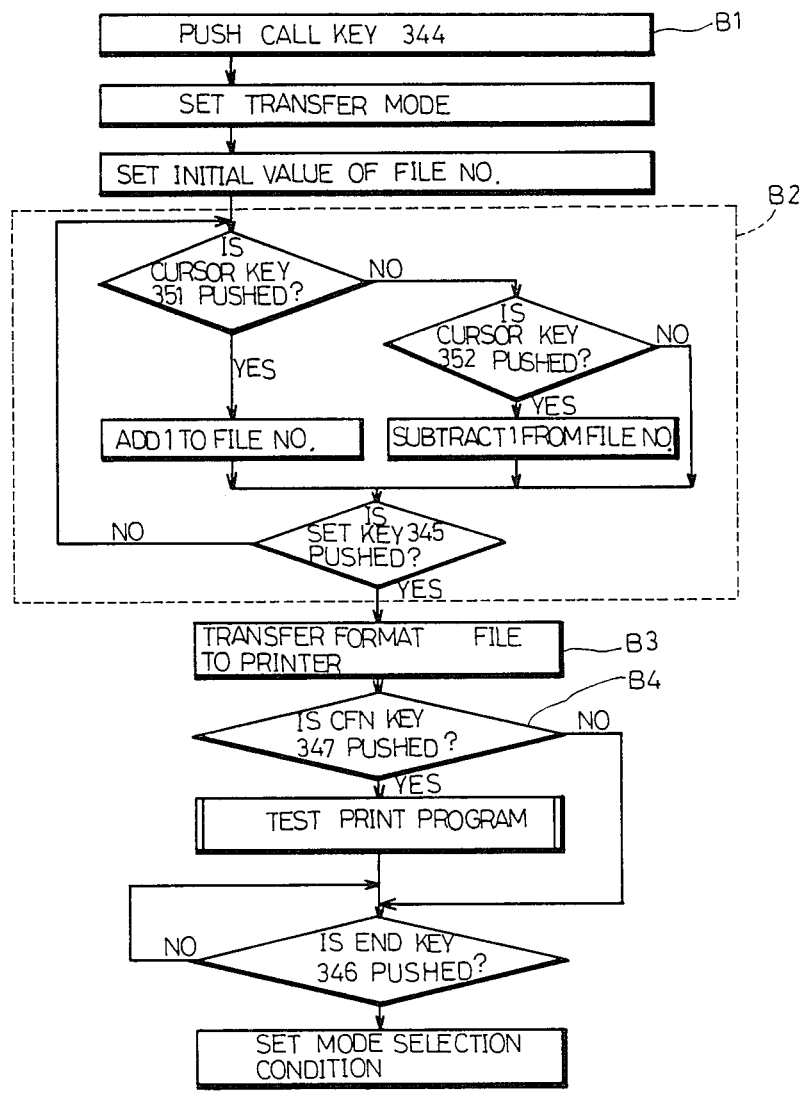
FIG. 7 is a flow chart showing an operational step of transferring a format file set to a memory in a printer.

FIG. 7 shows an operational process for carrying out printing according to the print format as registered above, wherein a format file corresponding to a print format stored in RAM 38 is transferred to RAM 66. Referring to FIG. 7, when the call key 344 is depressed in step B1, a transfer program of the format file is started, and an initial value of the file number is indicated by the display panel 300. In block B2, the cursor key 351 or 352 continues to be depressed until a desired file number is obtained. Upon obtaining the desired file number, the set key 345 is depressed. By the operation, a format file corresponding to the selected file number is transferred from RAM 38 and stored in RAM 66.

In step B4, it is determined whether or not the content of the transferred format file should be confirmed. If the content should be confirmed, the confirmation key 347 is depressed. If the confirmation key 347 is depressed, a test print program is executed.

FIG. 24 shows an example of the test print obtained by execution of the test print program. As can be seen, each of the data numbers as surrounded by each box is printed at the print start position determined according to each of the format data in the format file. The box has a size obtained by adding a character space specified by a space data to a character size. Owing to the box, position and space data of each format data may be confirmed. The data No. 2 has a box size larger than the other data numbers, and it may be confirmed that print data controlled according to the data No. 2 is printed with the character space increased.

Referring again to FIG. 7, if the end key 346 is depressed after confirmation, the transfer program is completed. Under the condition, the printer body is operated to carry out printing according to the format file as transferred to RAM 66.

Figure 8:
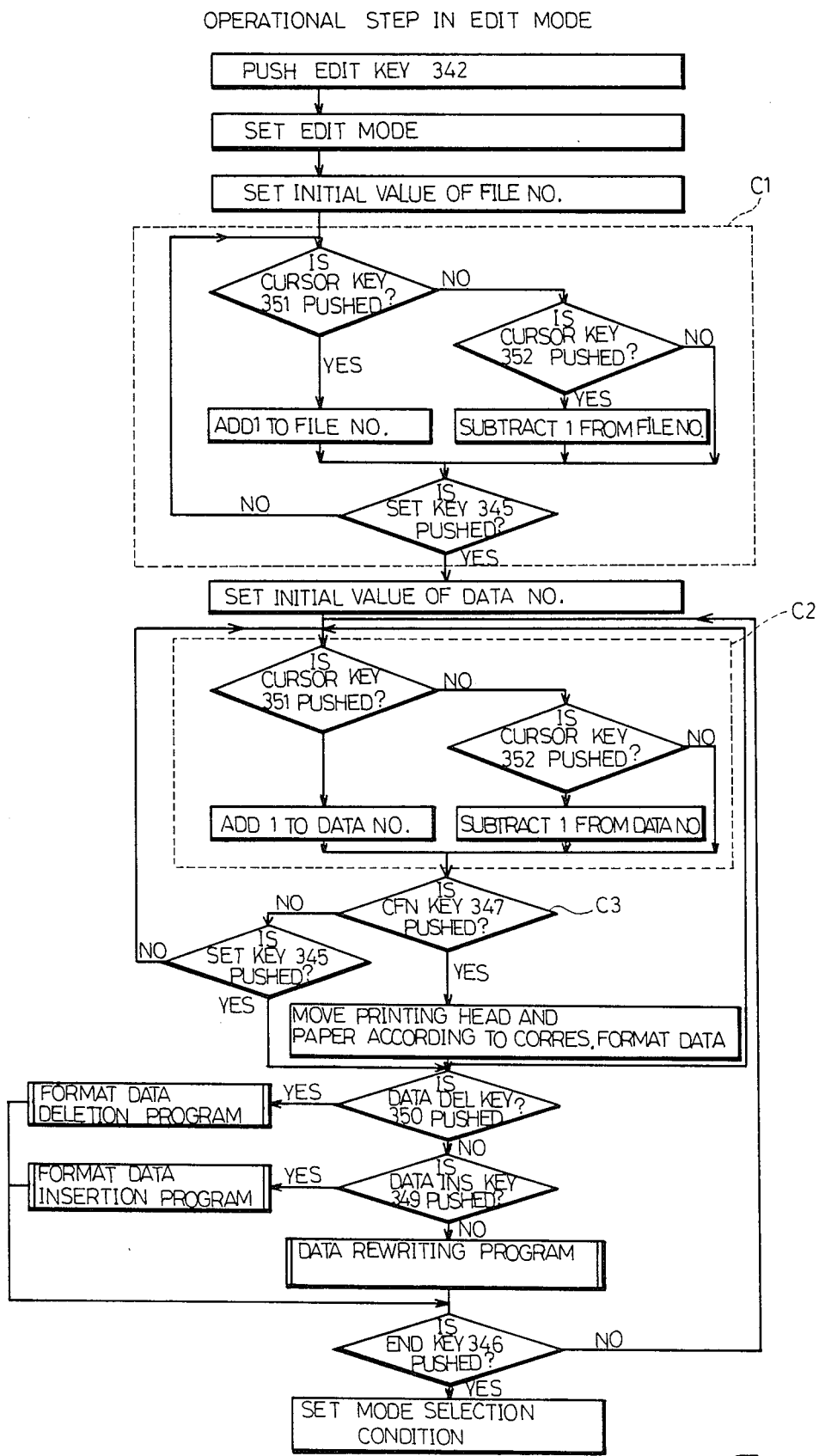
FIG. 8 is a flow chart showing an operational step of editing the format data once registered.

In the case that any error is found in the format file, the format file may be corrected according to the operational step shown in FIG. 8. First, the edit key 342 is depressed to start an edit program. When the edit program is started, an initial value of the file number is indicated by the display panel 300.

In block C1, the cursor key 351 or 352 is depressed to call a file number to be edited, and the setting key 345 is depressed to specify the file number.

Next, in block C2, the cursor key 351 or 352 is depressed to call a data number to be edited. Then, if the confirmation key 347 is depressed in step C3, the printing head 92 and the platen 77 are moved according to the format data of the specified file number and data number to confirm the format data prior to editing. Then, if the set key 345 is depressed, editing of the format data becomes possible.

Next, if the data delete key 350 is depressed, a format data delete program is executed to delete the current format data. The data numbers greater than the data number of the format data are shifted up one by one. On the other hand, if the data insert key 349 is depressed, a format data insert program is executed to prepare a format data by the same operation as described in the format data register mode and insert the format data newly prepared into the format file.

If neither the data insert key 349 nor the data delete key 350 is depressed, the cursor keys are operated to move the printing head and the platen to a new position and the set key 345 is depressed to rewrite the formating data to a new one. Upon completion of the editing operation, the end key 346 is depressed to end the edit program.

Figures 9, 10:
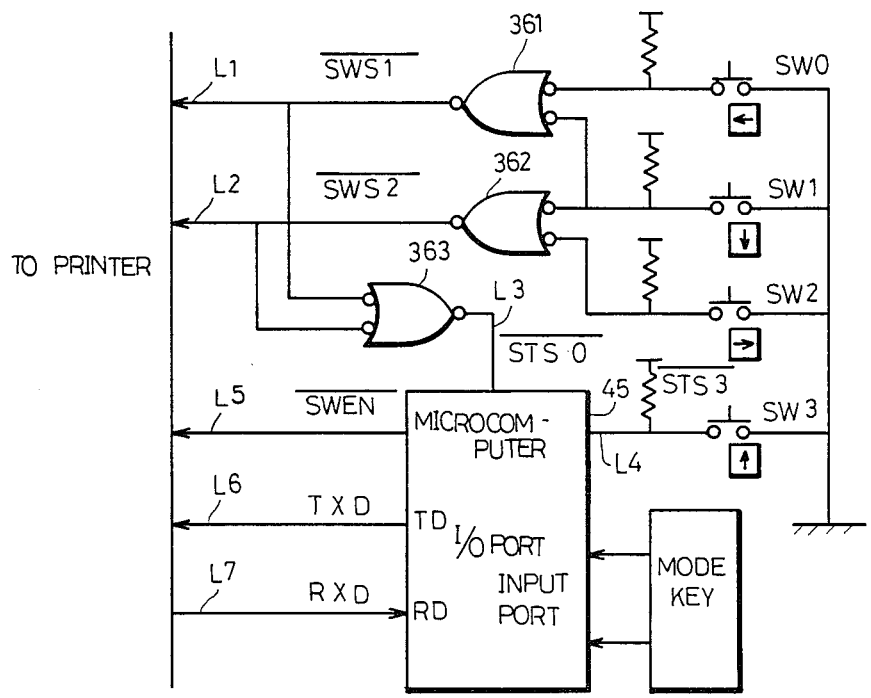
FIG. 9 is an electric circuit diagram showing electric connection between the operating device and a main device in the printer.
FIG. 10 is a logic showing a relation between cursor keys and printing head moving signals.

Referring now to FIG. 9 which shows an electric circuit diagram of connection between the operating device 30 and the printer body, and also to FIG. 10 which shows a signal logic chart for the circuit of FIG. 9, switches SW0, SW1, SW2 and SW3 correspond to cursor keys 353, 352, 354 and 351, respectively. Output signal lines L1 and L2 of gate circuits 361 and 362 respectively are connected to the main device in a printer body. The output signal lines L1 and L2 are also connected to a gate circuit 363. An output signal line L3 of the gate circuit 363 is connected to a microcomputer 45 which includes CPU 32 and RAM 38, etc. Further, an output signal line L4 of the switch SW3 is connected to the microcomputer 45. While either of the output signal lines L3 and L4 is in a low level, it is indicated that either of the cursor keys has been operated. Therefore, CPU 32 outputs a low level signal through an output signal line L5 to the main device in the printer body, and the main device analyzes a logic level of the signal lines L1 and L2 during the low level of the signal line L5 to thereby determine which cursor key has been operated. The main device may control the printing head and the platen owing to the low level signal. Further, the microcomputer 45 is connected through data lines L6 and L7 to the main device to carry out communication of control signals and transmission of a print format. The CPU 32 in the microcomputer 45 acts to detect a logic level of the signal lines L3 and L4 to determine which of the cursor key SW3 (351) or SW1 (352) has been operated. The cursor keys SW3 and SW1 are also utilized for respectively increasing and decreasing the registration number or other parameter one by one.

Figure 11:
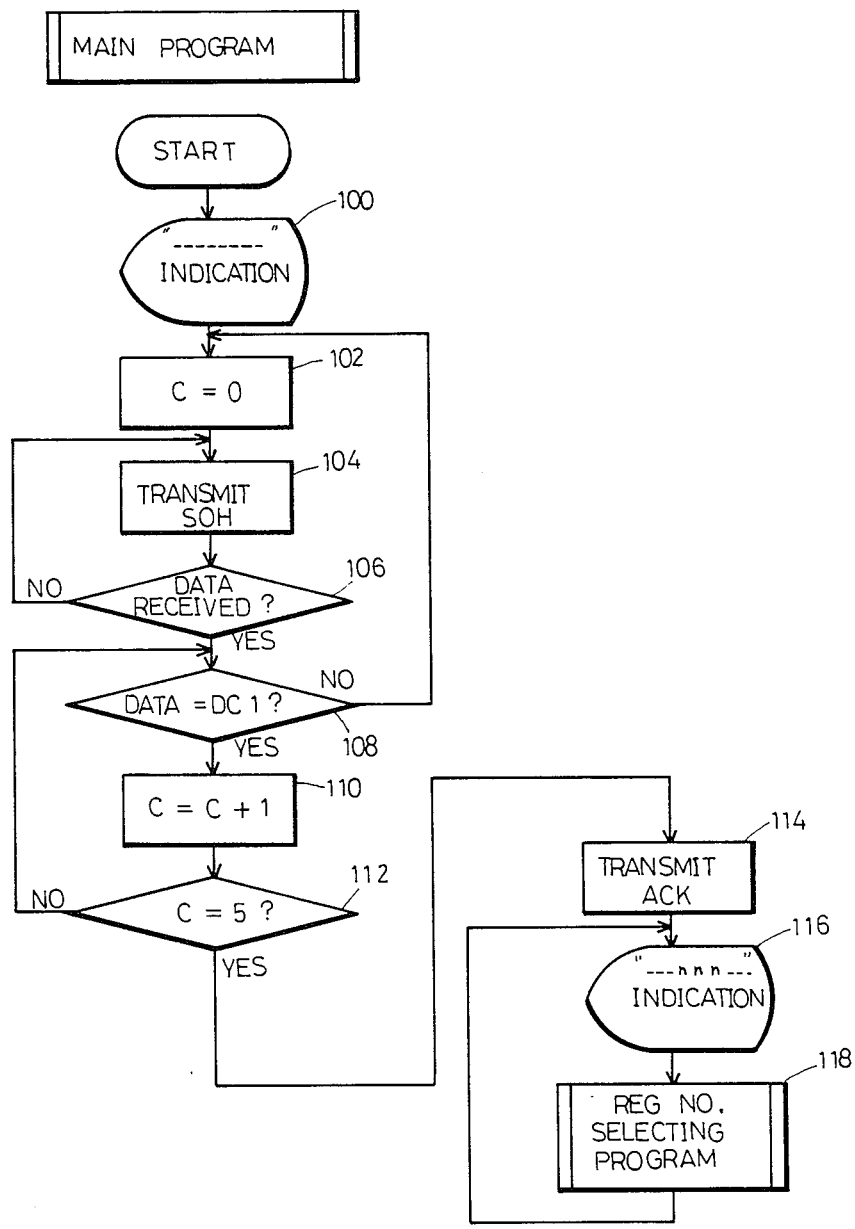
FIG. 11 is a flow chart of a main program of CPU in the operating device.
Figure 16:
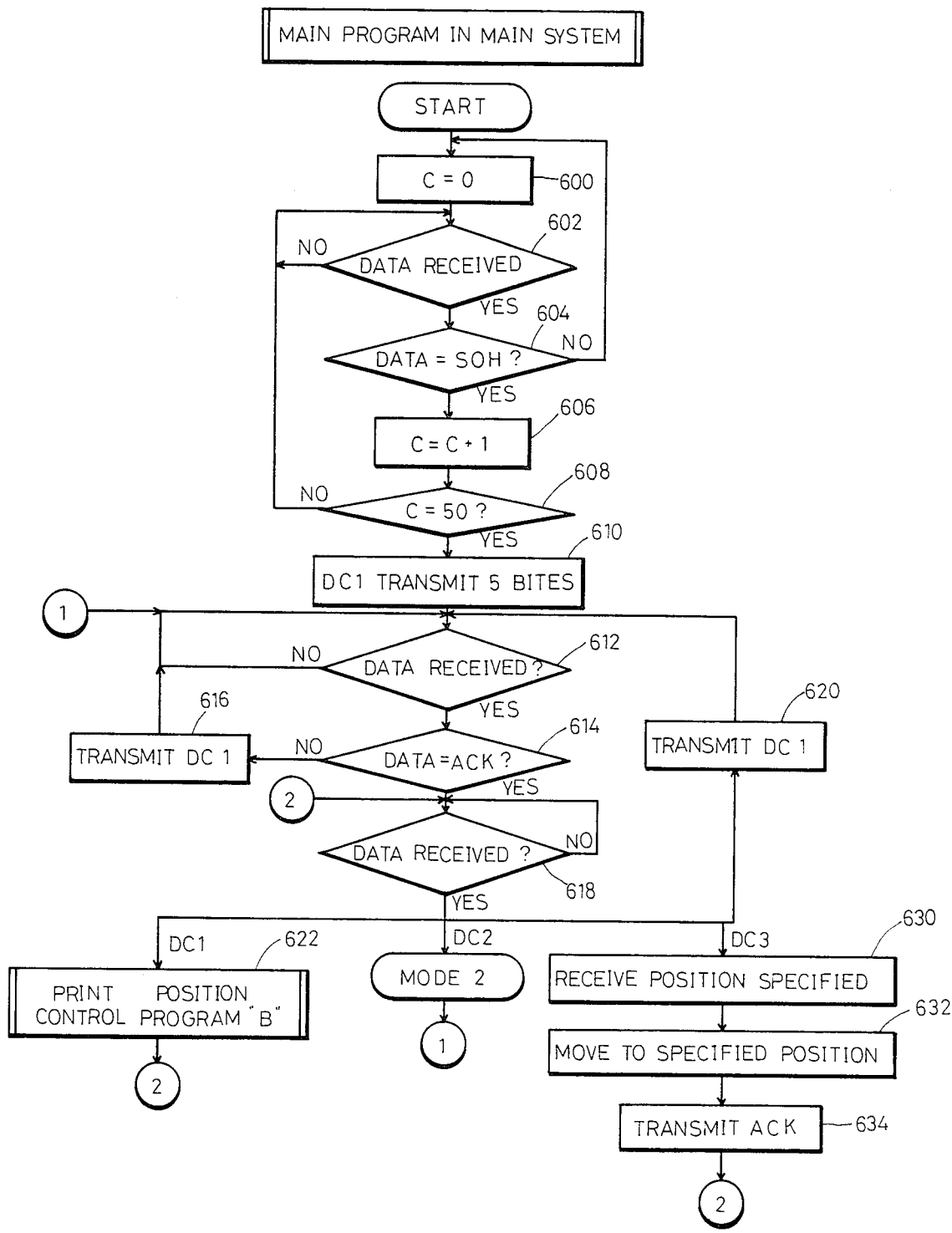
FIGS. 16 and 17 are flow charts showing a main program of CPU in the main device.

There will be now described registration of the print format. Referring to FIGS. 11 and 16, which are flow charts showing main programs for processing the CPU 32 in the operating device 30 and the CPU 68 in the main device in the printer body, when a power switch (not shown) of the operating device 30 is turned on, adjustment of interface between the operating device 30 and the main device is indicated on the display panel 300 in step 100. In step 102, the counter C is set to zero, and in step 104, a SOH signal is transmitted to the main device until a response signal is received from the main device at step 106. In step 108, a DC 1 signal is received from the main device, and in step 110, the counter C is renewed. If it is determined in step 112 that five DC 1 signals are received, an ACK signal is transmitted, and the number of residual registerable format data in step 116 is indicated on the display panel 300. On the other hand, as shown in FIG. 16, the main device receives 50 SOH signals from the operating device 30, and thereafter transmits 5 bytes of DC 1 signal according to the process of steps 600 to 610 to complete the connection between the operating device 30 and the main device of the printer body. After execution of the above-mentioned protocol, a registration number selection program is executed by the operating device 30 at step 118.

Figure 12:
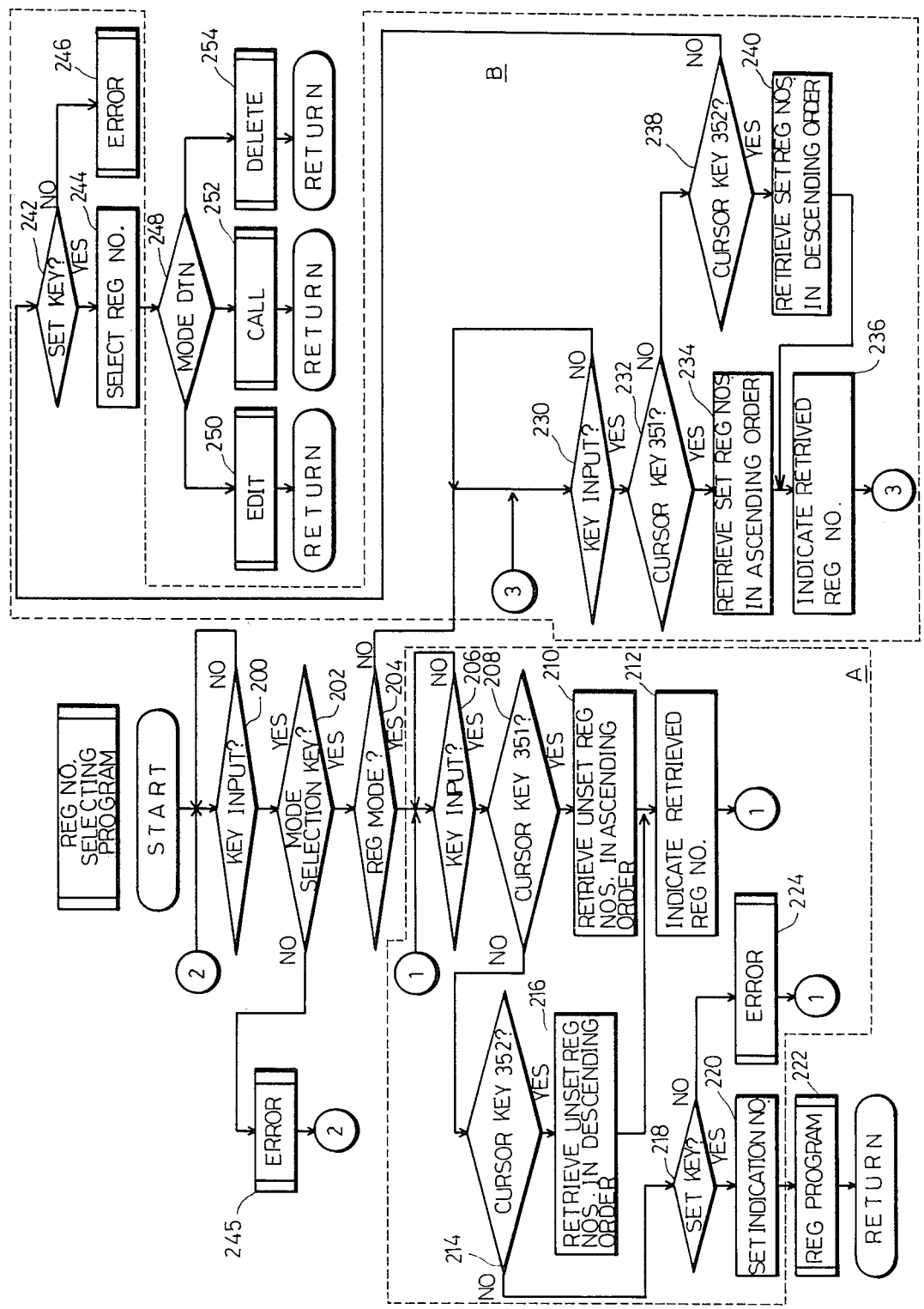
FIG. 12 is a flow chart of a registration format data number selection program.

Referring to FIG. 12 which is a flow chart showing a process of a registration number select program, when it is determined in step 200 that the keyboard 34 is operated, the routine proceeds to step 202 where it is determined that the mode select key in the mode 1 is depressed. If the registration key is depressed in step 204, the subsequent key depression is awaited in step 206. The program shown in FIG. 12 is an improved version of the program shown in FIG. 6. If the cursor key SW3 (351) is operated in step 208, the file numbers except registered file numbers are retrieved in the ascending order one by one (step 210), and are indicated on the display panel 300 (step 212). If the cursor key SW1 (352) is operated in step 214, the file numbers except registered file numbers are retrieved in the descending order one by one (step 216), and are indicated on the display panel 300 (step 212). When a desired file number is indicated by the aforementioned key operation, and the set key 345 is depressed, such set key depression being determined in step 218, the file number indicated is set in RAM 38 in step 220. Subsequently, in step 222, the register program of the format data of format file belonging to the chosen file number is executed.

Correction and deletion of the print format once registered in RAM 38 as well as transferring the format file to RAM 66 in the main device of the printer body are indicated by the processing in the block B including the steps 230 to 246. In the block B, the file numbers only which have been already registered are retrieved, and the file numbers are indicated in an ascending or descending order according to the operation of the cursor keys 351 and 352. Then, the set key is operated to select the file number indicated.

Figure 13:
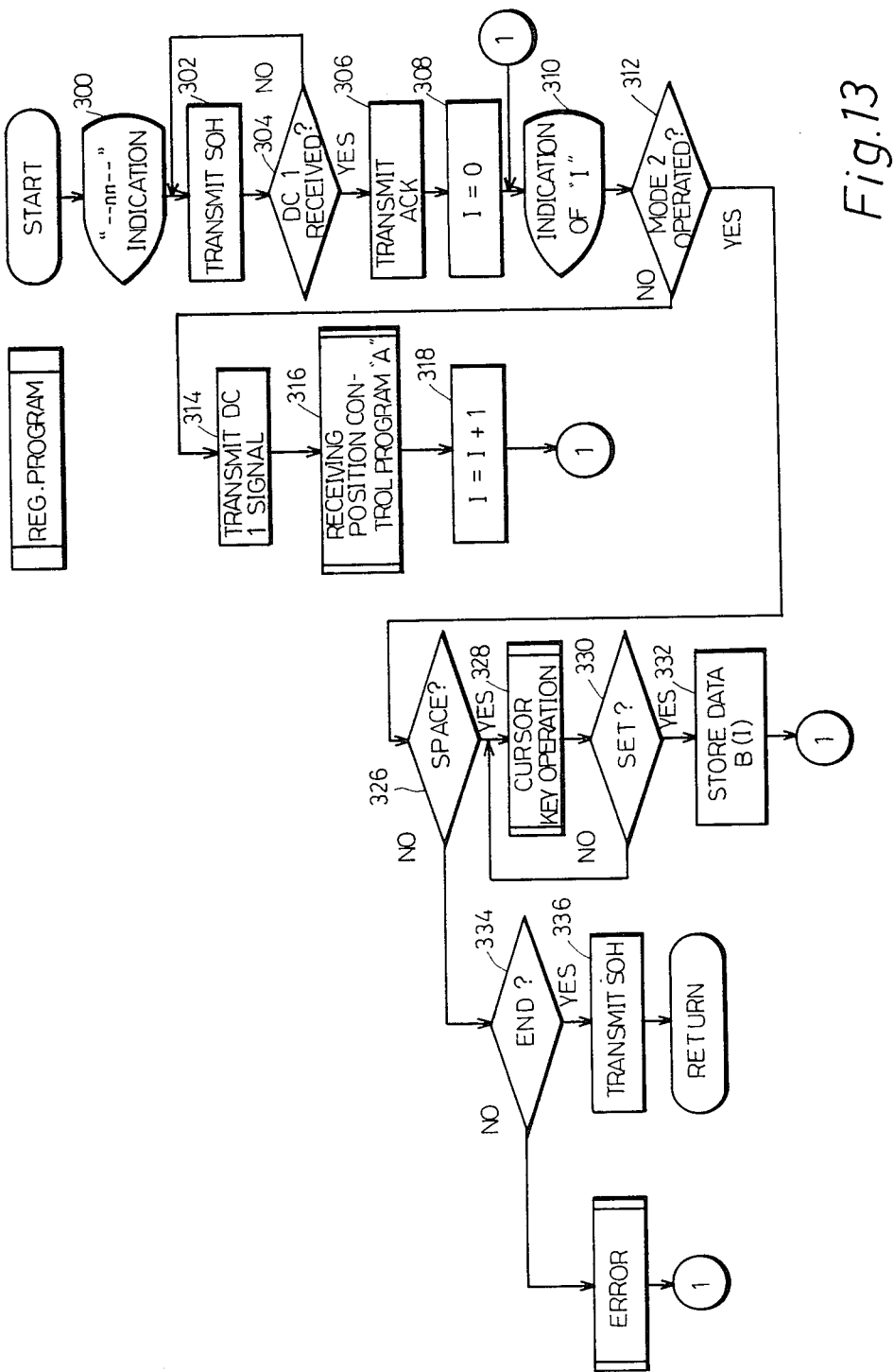
FIG. 13 is a flow chart of a registration program for registering the format data.
Figure 19:
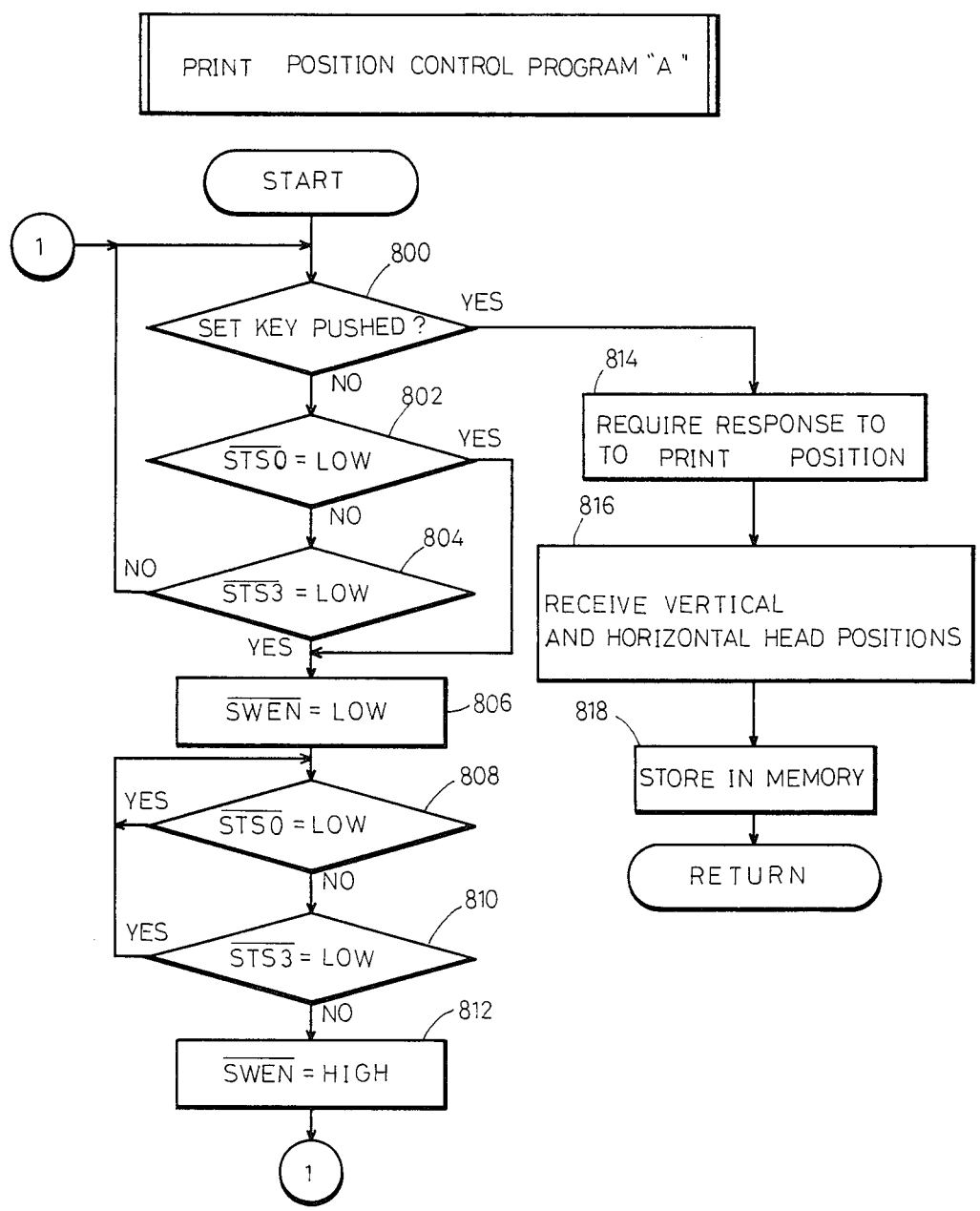
FIG. 19 is a flow chart showing a print position control program of the operating device for controlling a print position by operating cursor keys.

Referring to FIG. 13, which is a flow chart showing a process of the register program, a file number is indicated in step 300, and a SOH signal is transmitted to the main device in step 302. When the SOH signal is received by the main device in steps 612, 614 and 616 (See FIG. 16), a DC 1 signal is transmitted from the main device. If it is determined in step 304 that the DC 1 signal is received, an ACK signal is generated by the operating device 30 in step 306, and the routine proceeds to steps 308 and 310 where a data number I is indicated. A data No. 0 is used for centering control of the printing head with respect to the paper. That is to say, a centering position of the printing head is stored in a memory area corresponding to the data No. 0 of the format file. In step 314, the DC 1 signal is transmitted to make the main device in a print position control mode where the printing head 92 and the platen 77 are driven by the operation of the cursor keys. Then, in step 316, a print position control program A is executed as shown in FIG. 19. Further, the DC 1 signal is decoded in the main device to execute a print position control program B as shown in FIG. 20 in step 622 (See FIG. 16).

Figure 20:
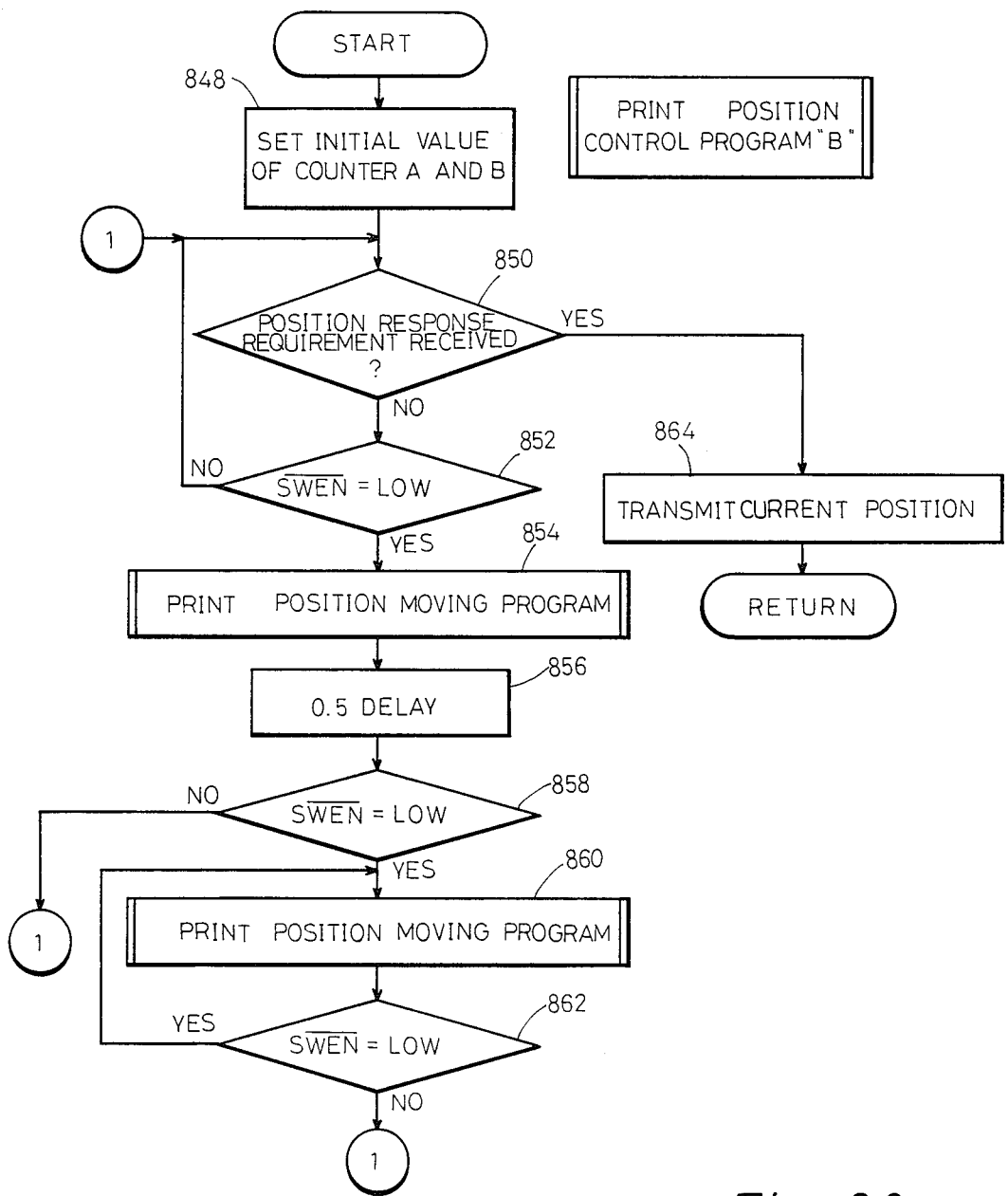
FIG. 20 is a flow chart showing a print position control program of the main device as similar to FIG. 19.

There will be now described a control means for controlling a print position of the printing head according to the operation of the cursor keys with reference to FIGS. 19 and 20. Referring to FIG. 19, it is determined in step 800 that the set key is depressed, and in steps 802 and 804 whether or not any cursor key is operated. That is, whether or not any cursor key is operated may be determined by detecting that either the signal line L3 ($\overline{STS0}$) or L4($\overline{STS3}$) is in a low level. If it is detected that any cursor key is operated, the routine proceeds to step 806 where the signal line L5 ($\overline{SWEN}$) becomes a low level, which condition is fed to the main device. On the other hand, when both the signal lines L3 ($\overline{STS0}$) and L4 ($\overline{STS3}$) become a high level in steps 808 and 810, and it is meant by the stop of the operation of the cursor keys, the signal line L5 ($\overline{SWEN}$) becomes a high level in step 812, which condition is informed to the main device.

Referring to FIG. 20, it is determined in step 850 whether or not a head position response requirement signal by the depression of the set key is received by the main device. In step 852, a signal level of the signal line L5 ($\overline{SWEN}$) is detected. If the signal level is low, it is determined that any cursor key is depressed. In step 854, the CR motor 80 is driven according to the logic level of the signal lines L1 ($\overline{SWS1}$) and L2 ($\overline{SWS2}$) (See FIG. 10) to move the printing head by one dot. Otherwise, the LF motor 76 is driven to feed the paper by a minimum unit quantity.

Figure 25:
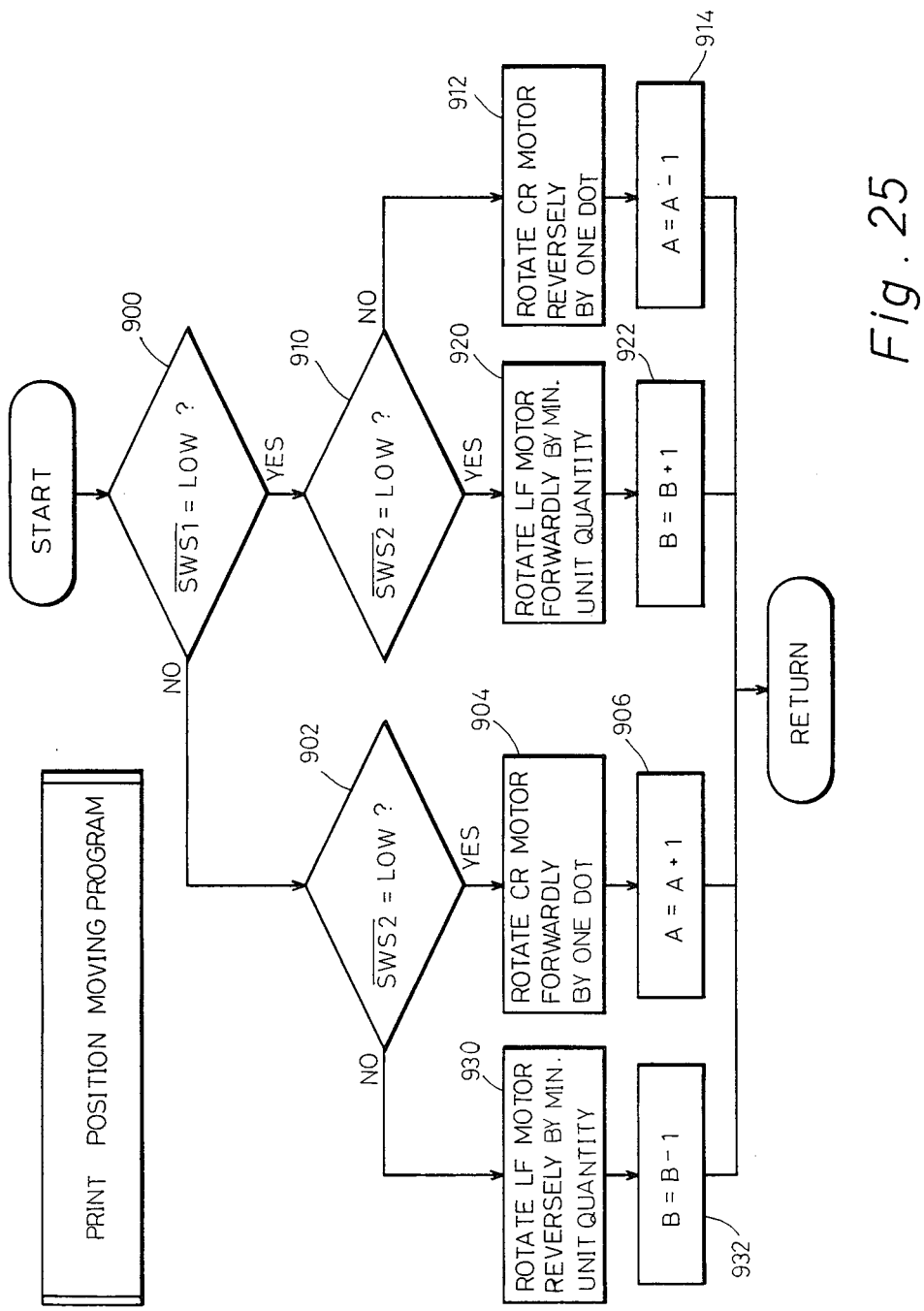
FIG. 25 is a flow chart showing a print position moving program for moving the print position and storing abscissa of the print position and feed quantity of a paper.

Referring to FIG. 25 which is a flow chart showing a receiving position moving program, if it is determined in step 900 that the signal line L1 ($\overline{SWS1}$) is in a high level, the routine proceeds to step 902 where a logic level of the signal line L2 ($\overline{SWS2}$) is determined. If the signal line L2 ($\overline{SWS2}$) is in a low level, the routine proceeds to step 904 where the printing head is rightwardly moved by one dot to forwardly rotate the CR motor 80 by a predetermined unit angle. Then, a counter A is increased by one in step 906, and an abscissa of the printing head receiving position at that time is stored. If it is determined in step 902 that the signal line L2 ($\overline{SWS2}$) is in a high level, the LF motor 76 is reversely rotated by the minimum unit quantity so as to feed the paper in the reverse direction. Then, a counter B is decreased by one in step 932, and a paper feed quantity at that time is stored. Similarly, if it is determined in step 900 that the signal line L1 ($\overline{SWS1}$) is in a low level, the routine proceeds to step 910 where a logic level of the signal line L2 ($\overline{SWS2}$) is determined. If the logic level is high, the routine proceeds to step 912 where the printing head is leftwardly moved to reversely rotate the CR motor 80 by one dot. Then, a counter A is decreased by one in step 914, and an abscissa of the print position at that time is stored. If it is determined in step 910 that the signal line L2 ($\overline{SWS2}$) is in a low level, the routine proceeds to step 920 where the LF motor 76 is forwardly rotated by the minimum unit quantity so as to feed the paper in the forward direction. Then, a counter B is increased by one in step 922, and a paper feed quantity is stored. In this manner, the coordinates of the print position relative to the paper may be stored.

Referring to FIG. 20, after waiting for 0.5 sec. in step 856, if it is determined in step 858 that the signal line L5 ($\overline{SWEN}$) remains in a low level, the cursor keys continue to be depressed, and therefore head or paper feed control is continuously carried out until the signal line L5 ($\overline{SWEN}$) becomes a high level in steps 860 and 862. As a result, while the cursor keys continue to be depressed, the print position is continuously changed. In this case, the counter A or B is changed in correspondence with the movement of the printing head 92 and the paper feed quantity, and the coordinates of the print position relative to the paper at that time are stored.

As mentioned above, when the cursor keys have been operated to move the printing head 92 to a desired horizontal position and feed the paper by a predetermined quantity, the key 345 is depressed, a response requirement signal ENQ of a print position is transmitted from the operating device 30 in step 814 (See FIG. 19). The main device determines receipt of the signal in step 850, and transmits an abscissa of the printing head 92 and a paper feed quantity to the operating device 30 in step 864 (See FIG. 20). The operating device 30 receives data of the cordinates of the print position relative to the paper in steps 816 and 818, and stores the data in RAM 38.

Although there has been above described a general moving process of a print position for setting a print start position of each unit print data, it is sufficient to move the printing head 92 only by using the cursor keys 353 and 354 for the purpose of registration of a printing head centering position. A set vertical coordinate shown by the counter B is not used for centering of the printing head 92 upon insertion of paper, but rather a set horizontal coordinate shown by the counter A is used.

According to the aforementioned operation, the print head centering position may be set at a center position C of the paper as shown in FIG. 21.

The aforementioned operation is sequentially repeated to set the coordinates of the print start positions (1) to (14) of all the unit print data on a sheet of paper as shown in FIG. 21. Thus, the registration of the print format control data is completed.

In the above process, if the space key 348 is depressed in step 326 (See FIG. 13), space data are indicated on the display panel 300 incrementally or decrementally by the operation of the cursor keys in step 328 as shown in block A8 in FIG. 6. Then, in step 330, it is determined that the set key 345 is depressed to select the indicated value. In step 332, the space data are prepared as a part of a print format. The space data is set independently of setting of the print position. In other words, the space data may be set at an arbitrary time. Once the space data is set, it is effective for setting of a receiving position until the next space data is set.

In step 334, it is determined that the end key 346 is depressed, and then in step 336, a SOH signal is transmitted, thus terminating the registration of the print format. At this time, the main device receives the SOH signal, and generates a DC 1 signal in step 620 (See FIG. 16) to enter a subsequent control data waiting condition.

Figure 14:
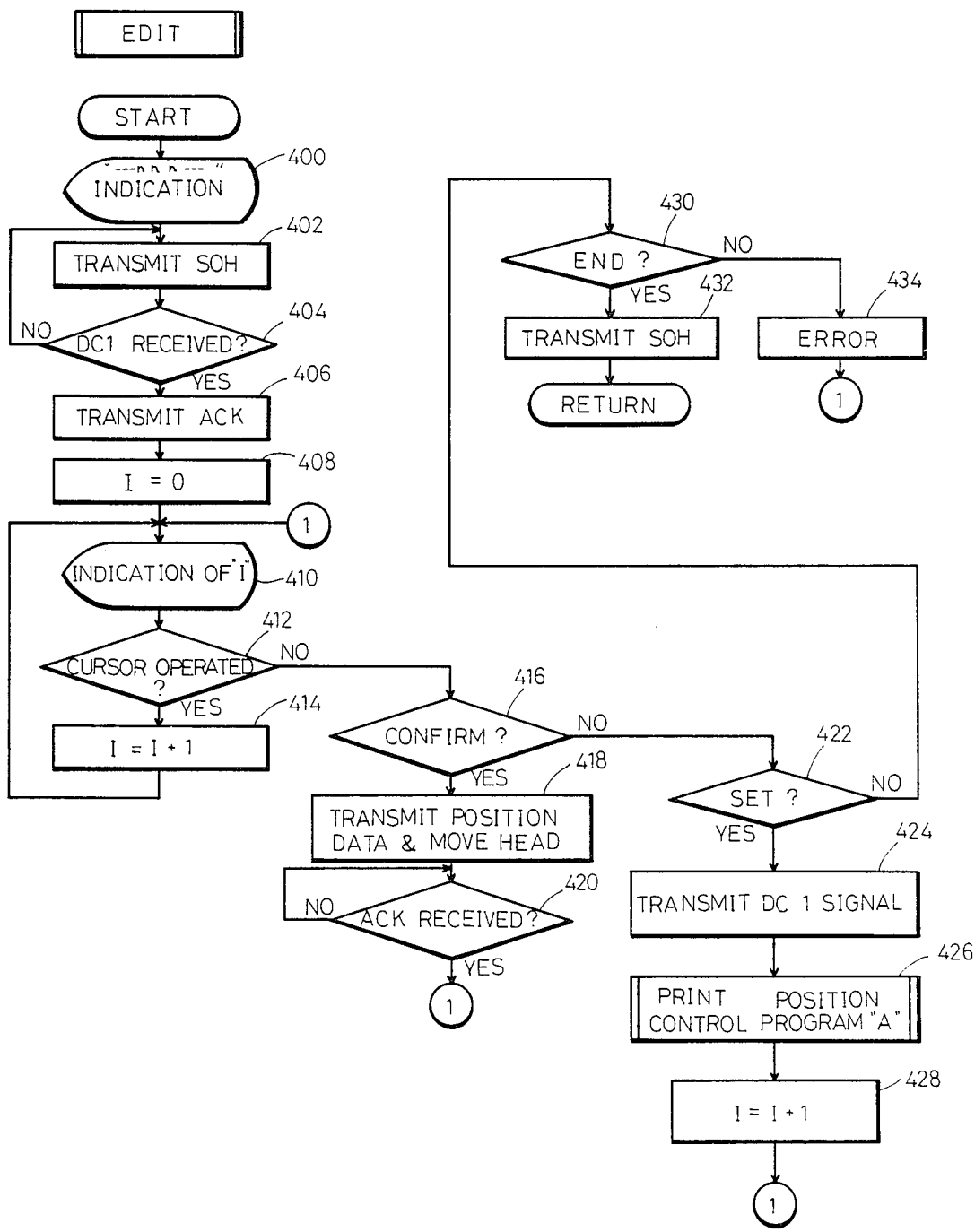
FIG. 14 is a flow chart of an editing program for editing the format data.

There will be now described a process for correcting a format control data as once registered with reference to FIG. 14. When the correction key is depressed in step 204 in FIG. 12, the program of block B is executed to retrieve a desired file number. Then, step 250 of the correction program shown in FIG. 14 is started. As shown in FIG. 14, steps 400 to 408 are similar to steps 300 to 308 in FIG. 13. Steps 410 to 414 are steps for subsequently indicating the formating data number of the print format as shown in block C2 in FIG. 8.

If the confirmation key 347 is depressed in step 416 after selection of a predetermined data number, a signal DC 3 for moving the printing head 92 and the platen 77 to a data set receiving position corresponding to the selected data number is transmitted with a format data. As shown in FIG. 16, the main device acts to move the print position to a print start position of the format data corresponding to the data number in steps 630 to 634 in FIG. 16. According to the operation, it is possible to investigate how the set format data has been set. At this time, a predetermined character, including space data, may be printed at the print start position. In this case, it is also possible to precisely confirm how the print position and the space data are determined. If the set key is depressed in step 422, the data number is selected, and the print position control program A (See FIG. 19) is started for directly moving the print position by the operation of the cursor keys in the same manner as in the registration mode. At this time, since the main device detects the DC 1 signal in step 618, it is conditioned in the registration mode. Under the condition, if the set key is depressed, the current print position is transmitted to the operating device 30 in step 864 in FIG. 20, thus completing correction of the format data. Then, in step 428, an indication parameter I of the next data number is renewed. In step 430, if it is determined that the end key 346 is depressed, the correction program is terminated.

In particular, if the confirmation key 347 is depressed in case of data number 0, the printing head 92 is moved to a data set centering position of the printing head 92. Accordingly, it is possible to confirm whether or not the centering position of the printing head 92 is right. Further, as is mentioned above, the set centering position of the printing head 92 may be modified and reset.

There will be now described a process for test printing according to the print format as prepared above and a process for receiving a print data from a host computer 50 and printing the data.

Figure 15:
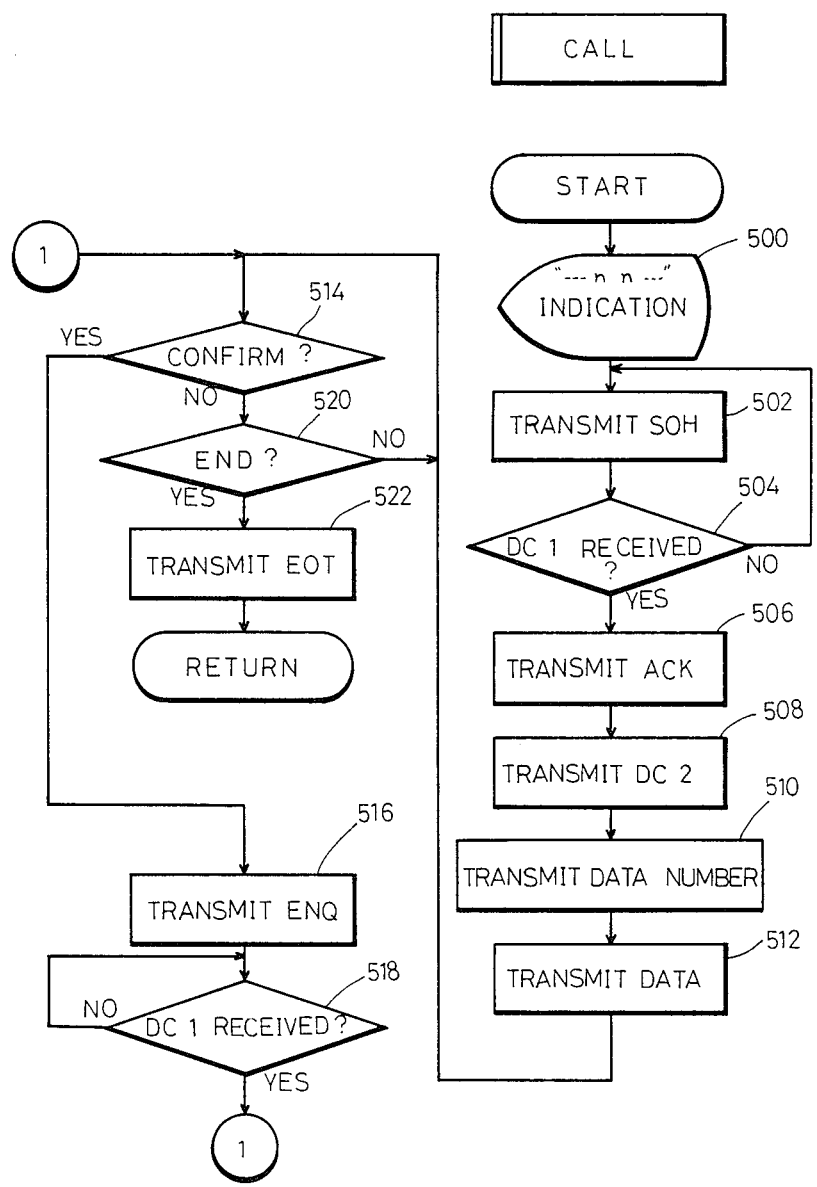
FIG. 15 is a flow chart of a calling program for transferring the format file prepared to the main device in the printer.

In the processing shown in FIG. 12, if the call key 344 is depressed in step 204, the program in block B is executed, and the number of the print format is selected. Then, the call program shown in FIG. 15 is executed in step 252. Referring to FIG. 15, steps 500 to 506 are the same as steps 300 to 306 in FIG. 13. When a control signal DC 2 is transmitted in step 508, the main device executes the program shown in FIG. 17 through step 618 shown in FIG. 16. In step 510, the number of data in the format file is transmitted, while in step 512, the format data are transmitted. The main device receives the number of data in step 650 shown in FIG. 17, and receives the format data in steps 652 and 654. At this stage, the format data of the specified file number has been transferred in a lump from RAM 38 to RAM 66.

Next, if it is detected in step 514 that the confirmation key 347 is depressed, a control signal ENQ for test print is transmitted in step 516. The main device decodes the control signal in step 656, and executes the test print program in step 658.

Figure 23:
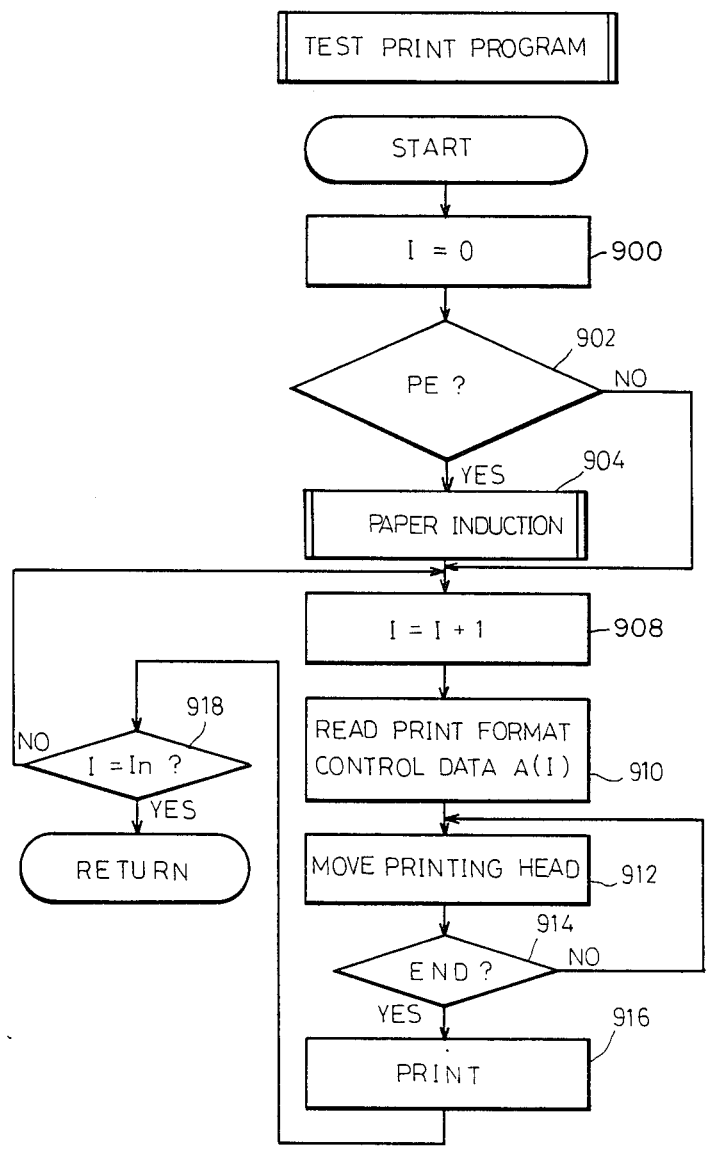
FIG. 23 is a flow chart showing a test print program.

Referring to FIG. 23 which is a flow chart showing a process for test print, a parameter I equivalent to a data number is set to zero in step 900, and steps 902 and 904 denote a paper feed process. If a paper empty signal PE generated by a known sensor (not shown) is detected in step 902, the routine proceeds to step 904 where paper is inserted. The program of step 904 will be described in detail in FIG. 26. Then, the routine proceeds to step 908 where the value of the parameter I is renewed. In step 910, a format data is read, and in steps 912 and 914, the printing head 92 and the platen 77 are moved to a set print position. At this position, a predetermined symbol (data number and the surrounding box) is printed (step 916). In step 918, it is determined whether or not the test print has been terminated. If a final data number is not reached, the routine proceeds back to step 908 to repeat the above process and carry out the test print in the subsequent print position. Upon completion of the test print, the result is shown in FIG. 24.

Figure 17:
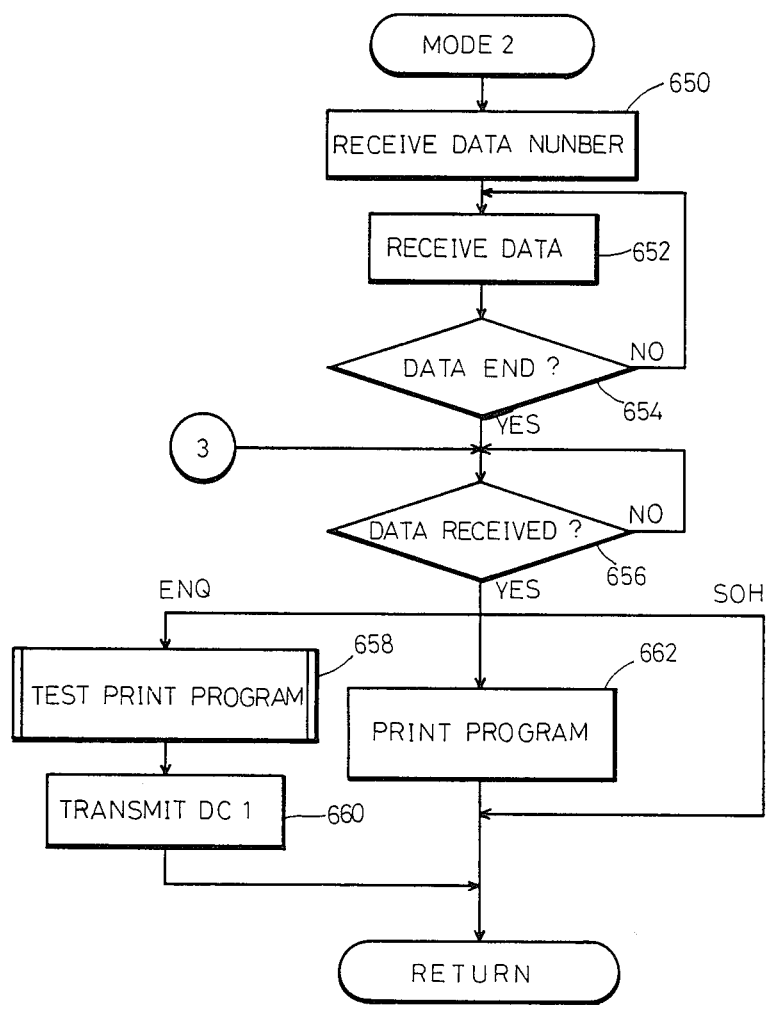

Referring to FIG. 24, encircled numerals represent data numbers corresponding to the print positions. A rectangular box M has a lateral length equal to a width of character plus a space gap between characters, and has a vertical length equal to a height of character. In view of the result of the test print, it is possible to confirm whether or not data printing position and space data are accurately set. When the test print is terminated, the DC 1 signal is transmitted in step 660 as shown in FIG. 17 to inform the termination of the test print.

Referring to FIG. 15, if it is detected that the end key 346 is depressed in step 520, a control signal EOT of data printing command is transmitted in step 522. At this time, the main device goes to step 662 where a print program (See FIG. 18) for printing a print data transmitted from the host computer 50 is executed.

Figure 18:
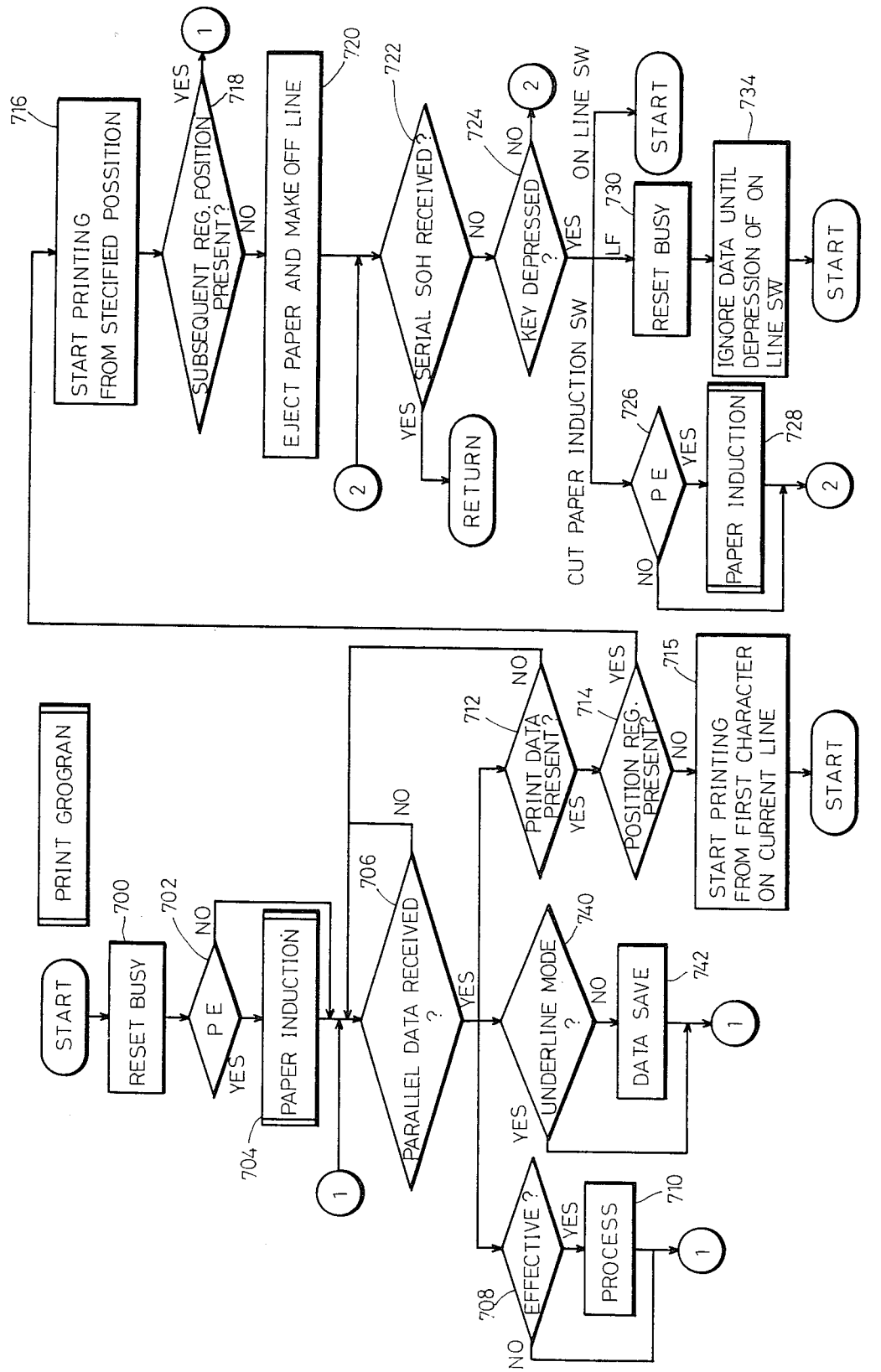
FIG. 18 is a flow chart showing a print program for processing printing of print data received from the host computer.

Referring to FIG. 18, BUSY bit of the status register 64 is made OFF in step 700 to allow the print data from the host computer 50 to be input. FIG. 22 shows a result of the print data indicated on a CRT display (not shown) of the host computer 50. As shown in FIG. 22, the print data comprise underlined comments which are arranged in the order of the data Nos. and are not printed, unit print data, and CR and LF codes for separating the unit print data from each other. In the preferred embodiment, the data numbers are not input as the print data. Steps 702 and 704 show a paper supply processing. If a paper end signal PE is detected in step 702, a paper introduction program for inserting a paper is executed in step 704.

Figure 26:
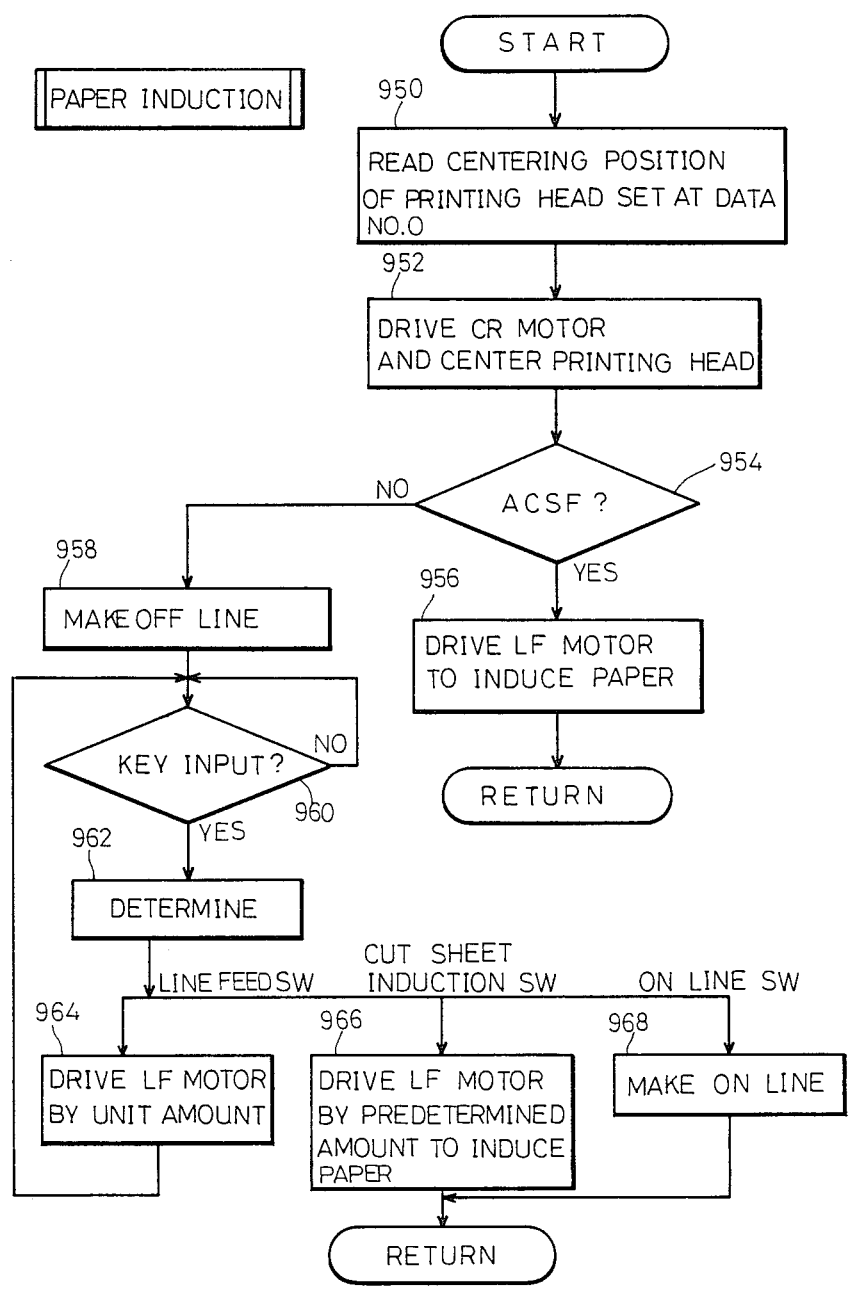
FIG. 26 is a flow chart showing an operational step of paper induction.

Referring to FIG. 26 which is a flow chart showing the process of paper insertion, printing head centering position data stored as a data No. 0 of the format file, for example, is read from RAM 66 in step 950. In step 952, a signal for driving the CR motor 80 by a predetermined amount is generated to move a print position to a printing head centering position as set at data No. 0. Accordingly, the printing head 92 is moved to preset a center position of the paper before insertion of the paper. Then, the routine proceeds to step 954 where it is determined whether or not the printer is set in an automatic cut sheet feed (ACSF) mode. The ACSF mode is a mode where plural sheets of papers stacked in a known device are inserted through a friction roller into a printer one by one. In the case that the device is not used, the papers are manually inserted into the printer one by one by an operator. If YES, the routine proceeds to step 956 where the LF motor 76 is driven by a predetermined amount to feed the paper to a position opposed to the printing head 92. If NO, the routine proceeds to step 958 where the printer is selected to OFF LINE. In step 960, it is determined whether or not key input on the operating panel of the printer has been effected. If YES, the routine proceeds to step 862 where the kind of key activated is determined. Then, if a line feed switch is depressed, the LF motor 76 is rotated by a predetermined unit amount in step 964 to move the paper forwardly or reversely by a one line. If a cut sheet induction switch is depressed, the routine proceeds to step 966 where the LF motor 76 is rotated by a predetermined amount to feed the paper to a position opposed to the printing head. After the cut sheet paper is fed by depressing the line feed switch and the cut sheet induction switch, an ON LINE switch is depressed to select ON LINE in step 968 to make the printer in a printable condition. Thus, the paper feeding program is terminated.

Thereafter, the routine proceeds to step 706 in FIG. 18 so as to process the printing operation. In step 706, it is determined whether or not the print data has been received. Step 708 and 710 show a command processing. Step 740 to 742 are provided for skip-read of the data in case of comments which is underlined. In step 712 to 718, if the LF code is detected, it is rerouted for the purpose of separation of the unit print data, and the data are printed at predetermined positions according to the format data. Step 706 to 718 are repeated to print the data at all the print positions. As a result, the printing head 92 and the platen 77 are automatically moved to each of the print positions (1) to (14) registered as shown in FIG. 21 to print each unit data of the data Nos. (1) to (14) corresponding to the print positions.

In step 720, the paper is automatically ejected after the data are fully printed at all the print positions on the paper. In step 722, if the SOH signal is received from the operating device 30, the routine is returned to step 612 shown in FIG. 16 so as to effect changeover of connection from the host computer to the operating device 30. Steps 724 to 734 are provided for carrying out a process according to operation of keys on an operating panel of the printer body.

As is described above, according to the present invention, the printing head 92 is actually moved according to a paper size and a paper setting position to suitably set a centering position of the printing head 92 and store the centering position per each kind of paper. Accordingly, once the centering position is stored, it is not required to set the centering position of the printing head 92 each time the paper size changes. Since the printing head 92 is set in the center position of the paper, the paper may be smoothly supplied to thereby prevent generation of a paper jam.

Having thus described the preferred embodiment of the invention, it should be understood that numerous structural modifications and adaptations may be made without departing from the spirit of the invention.

What is claimed is:

1. A serial printer for receiving a sequence of plural unit print data to be distinguished from each other by a distinguishing signal, moving a printing head (92), feeding a print paper in a direction perpendicular to a moving direction of said printing head (92), and sequentially printing characters or the like at desired positions on said print paper; said serial printer comprising:

(a) cursor key means (351–354) for outputting a signal relating to the movement of said printing head (92) and the feed of said print paper according to key operation;

(b) printing head position control means (12) for controlling a moving position of said printing head (92) and a feed quantity of said print paper according to said signal relating to the movement of said printing head (92) and the feed of said print paper;

(c) print format control data storage means (16, 38) for sequentially stacking data relating to the moving position of said printing head (92) and the feed quantity of said paper every time said printing head (92) is actually moved to a desired position with respect to said print paper by driving said control means (12) according to the operation of said cursor key means (351–354);

(d) receive means (14A) for sequentially receiving said sequence of said plural unit print data distinguished from each other by said distinguishing signal;

(e) output means (14B) for sequentially outputting one of said data stacked by said storage means (16, 38) and one of said plural unit print data; and (f) print control means (18) for printing characters or the like corresponding to said unit print data output from said output means (14B); wherein:

said serial printer is programmed such that when said output means (14B) outputs one of said data relating to the moving position of said printing head and the feed quantity of said print paper said control means (12) is driven to move said printing head with respect to said print paper to a position to be determined by said one of said data relating to the moving position of said printing head and the feed quantity of said print paper, and then said print control means (18) is driven to print one of said unit print data, and when the print operation of said print control means is ended, said output means (14B) outputs a subsequent data according to said distinguishing signal.

2. The serial printer according to claim 1 further comprising counter means (13) for counting a position of said printing head (92) and a feed quantity of the paper continuously and set key means (102) for commanding the storage of a value counted by said counter means (13) at the moment when said set key means (102) is operated in said print format control data storage means (16).

3. The serial printer as defined in claim 1 further comprising a printer body including said printing head and an operating device including said cursor key means, said operating device being independent of said printer body.

4. The serial printer according to claim 1, wherein said signal for distinguishing a unit print data from other unit print data is LF (line feed) signal.

5. The serial printer according to claim 1, further comprising key means (348, 351-354) for setting a print pitch and print pitch control means (20) for specifying a print pitch of printing character data according to the print pitch set by the operation of said key means, wherein said print pitch is stored in said print format control data storage means (16) upon sequential storage of said positions of said printing head (92) and said feed quantity of said paper, and said output means (14B) is arranged for driving said printing head (92) according to said print pitch stored in said print format control data storage means (16).

6. The serial printer according to claim 1, further comprising key means (347) for confirming print format control data stored in said print format control data storage means (16) and print format control data confirmation control means (22) for outputting print format control data stored in said print format control data storage means (16) to said printing head position control means (12) to move said printing head (92) and said paper to the position determined by the print format control data in the case said key means (347) is operated.

7. The serial printer according to claim 6, wherein said print format control data confirmation control means (22) outputs print format control data stored in said print format control data storage means (16) to said printing head position control means (12) to move said printing head (92) and said paper to the position determined by the print format control data and control said print control means (18) to print a predetermined character at the position.

8. The serial printer according to claim 6, further comprising key means (348, 351-354) for setting a print pitch and print pitch control means (20) for specifying a print pitch of printing character data according to the print pitch set by the operation of said key means, wherein said print pitch is stored in said print format control data storage means (16) upon sequential storage of said positions of said printing head (92) and said feed quantity of said paper, and said output means (14B) is arranged for driving said printing head (92) according to said print pitch stored in said print format control data storage means (16), wherein said print format control data confirmation control means (22) outputs print format control data stored in said print format control data storage means (16) to said printing head position control means (12) to move said printing head (92) and said paper to the position determined by the print format control data and control said print control means (18) to print a predetermined character and information concerning print pitch at the position.

9. The serial printer according to claim 8, wherein said information concerning print pitch is printed by a rectangular box whose width equals to the amount of character width and printing pitch.

10. The serial printer according to claim 6, further comprising key means (342, 351, 352) for specifying one of print format control data, wherein said print format control data confirmation control means (22) outputs said print format control data chosen to said printing head position control means (12).

11. The serial printer according to claim 6, wherein said print format control data confirmation control means (22) further comprises data reset means for freshly storing a position of said printing head (92) and a feed quantity of the paper when said printing head (92) is moved to a new position by driving said printing head position control means (12) according to cursor key (351-354) operation.

12. In a serial printer including a platen (77) for feeding a paper and a printing head (92) adapted to be moved in a direction perpendicular to a paper feed direction to carry out printing, and a paper holder (15) arranged in opposed relation with said platen (77) with a small gap defined between said paper holder (15) and said platen (77), said paper holder (15) being movable with said printing head (92), the paper being inserted into the small gap between said platen (77) and said paper holder (15) along a circumferential surface of said platen (77); the improvement comprising:
 an operating panel (30) having a head position moving key means (101) for commanding movement of said printing head (92) and set key means (102) for commanding setting of head position data;
 printing head position control means (12) for receiving an operation signal from said head position moving key means (101) and outputting a signal for moving said printing head (92) according to an operational condition of said head position moving key means (101) and controlling movement of said printing head (92);
 counter means (13) for counting movement of said printing head (92) and retaining coordinates of a current head position of said printing head (92);
 position memory means (15) for storing a value retained by said counter means (13) when said set key means (102) is operated; and
 paper feed control means (17) for receiving data stored in said position memory means (15) upon introduction of the paper, for outputting a signal for moving said printing head (92) to a position set by said position memory means (15), and thereafter outputting a signal for controlling feed of the paper to feed the paper.

* * * * *